United States Patent
Lew et al.

(10) Patent No.: US 11,300,515 B2
(45) Date of Patent: Apr. 12, 2022

(54) METHODS FOR QUANTIFYING AND ENHANCING ACCURACY IN MICROSCOPY USING MEASURES OF LOCALIZATION CONFIDENCE

(71) Applicants: Matthew Lew, St. Louis, MO (US); Arye Nehorai, St. Louis, MO (US); Hesamaldin Mazidisharfabadi, St. Louis, MO (US)

(72) Inventors: Matthew Lew, St. Louis, MO (US); Arye Nehorai, St. Louis, MO (US); Hesamaldin Mazidisharfabadi, St. Louis, MO (US)

(73) Assignee: Washington University, St. Louis, MO (US)

( * ) Notice: Subject to any disclaimer, the term of this patent is extended or adjusted under 35 U.S.C. 154(b) by 0 days.

(21) Appl. No.: 16/943,937

(22) Filed: Jul. 30, 2020

(65) Prior Publication Data

US 2021/0033536 A1    Feb. 4, 2021

Related U.S. Application Data

(60) Provisional application No. 62/880,495, filed on Jul. 30, 2019.

(51) Int. Cl.
*G01N 21/64*   (2006.01)
*G06T 7/73*    (2017.01)

(52) U.S. Cl.
CPC .......... *G01N 21/6458* (2013.01); *G06T 7/73* (2017.01); *G06T 2207/10056* (2013.01); *G06T 2207/30168* (2013.01); *G06T 2207/30241* (2013.01)

(58) Field of Classification Search
CPC .... G06T 7/70; G06T 7/73; G06T 7/75; G06T 7/77; G06T 2207/10056; G06K 9/00127; G06K 9/0014; G06K 9/6215; G01N 21/6404; G01N 21/6408; G01N 21/6456; G01N 21/6458
See application file for complete search history.

(56) References Cited

U.S. PATENT DOCUMENTS

2013/0294645 A1* 11/2013 Sibarita ............... G06T 7/11
                                                    382/103
2017/0370847 A1* 12/2017 Ghadiali ............ G01N 21/6458

OTHER PUBLICATIONS

Mazidi et al., "Measuring localization confidence for quantifying accuracy and heterogeneity in single-molecule super-resolution microscopy", Proc. SPIE vol. 11246: Single Molecule Spectroscopy and Superresolution Imaging XIII, Feb. 2020. (Year: 2020).*
Mazidi et al., "Quantifying accuracy and heterogeneity in single-molecule super-resolution microscopy", Nature Communications, 2020. (Year: 2020).*

* cited by examiner

*Primary Examiner* — Andrew W Johns

(57) ABSTRACT

Systems and methods assessing the accuracy of at least one localization from a single molecule localization microscopy (SMLM) dataset containing a plurality of localizations are described. The systems and methods calculate a Wasserstein-induced flux (WIF) value indicative of a confidence in the accuracy of a localization within the SMLM data set.

15 Claims, 31 Drawing Sheets

(23 of 31 Drawing Sheet(s) Filed in Color)

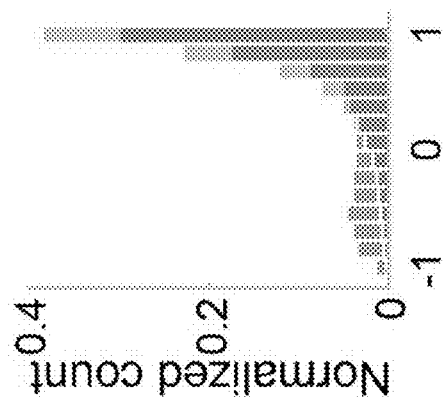
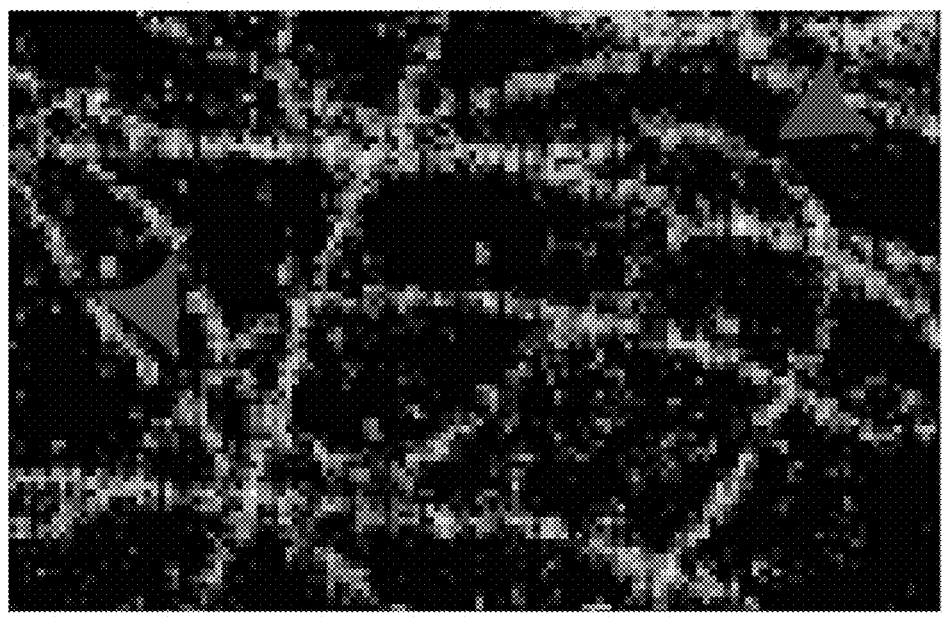
FIG. 4C
FIG. 4D
FIG. 4E

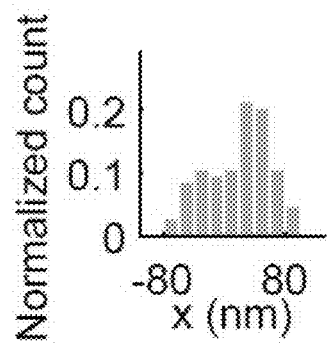
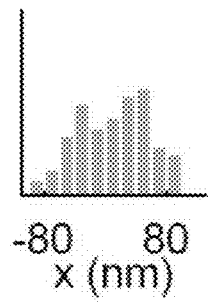
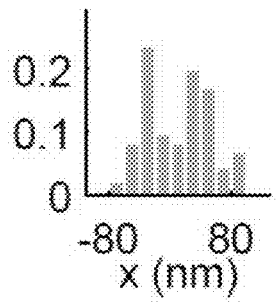
FIG. 5D    FIG. 5E    FIG. 5F
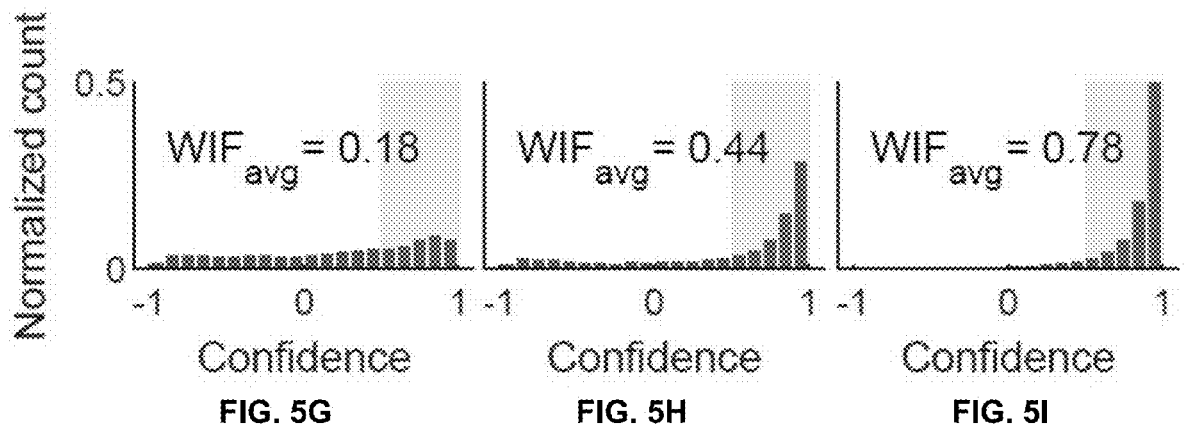
FIG. 5G    FIG. 5H    FIG. 5I
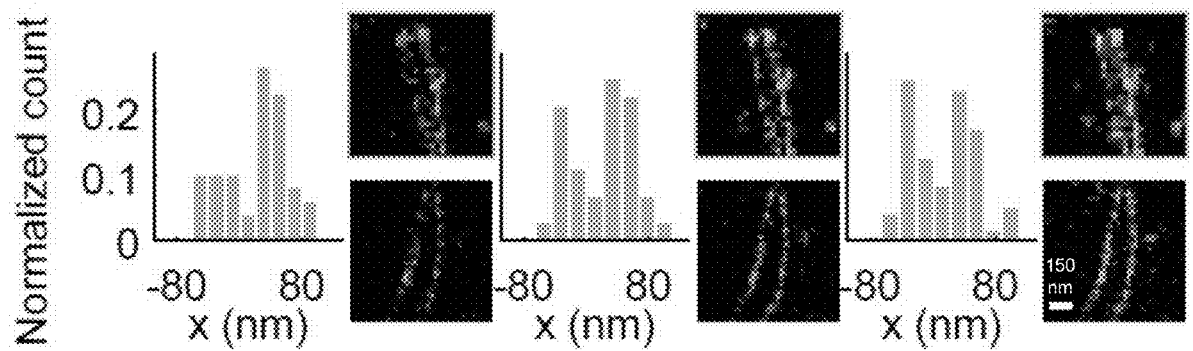
FIG. 5J    FIG. 5K    FIG. 5L

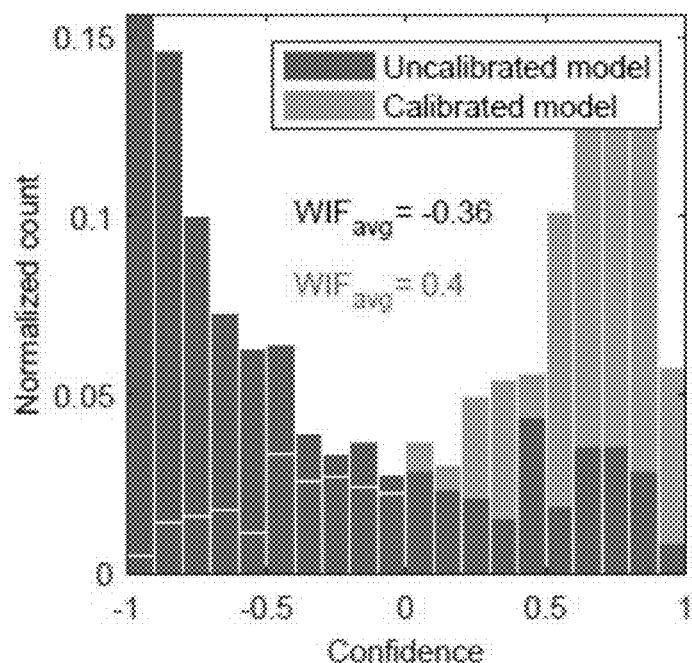
FIG. 12A
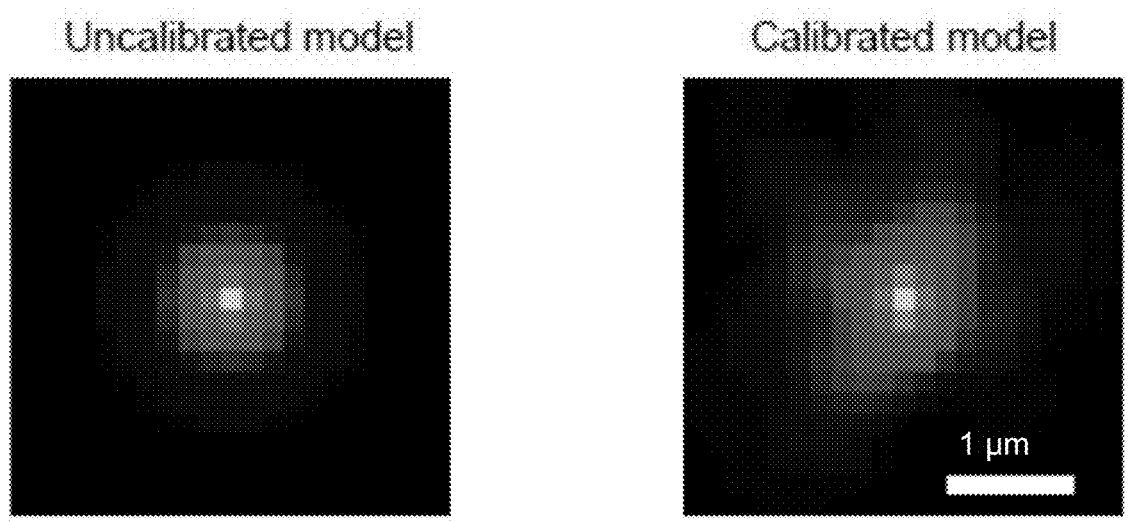
FIG. 12B   FIG. 12C

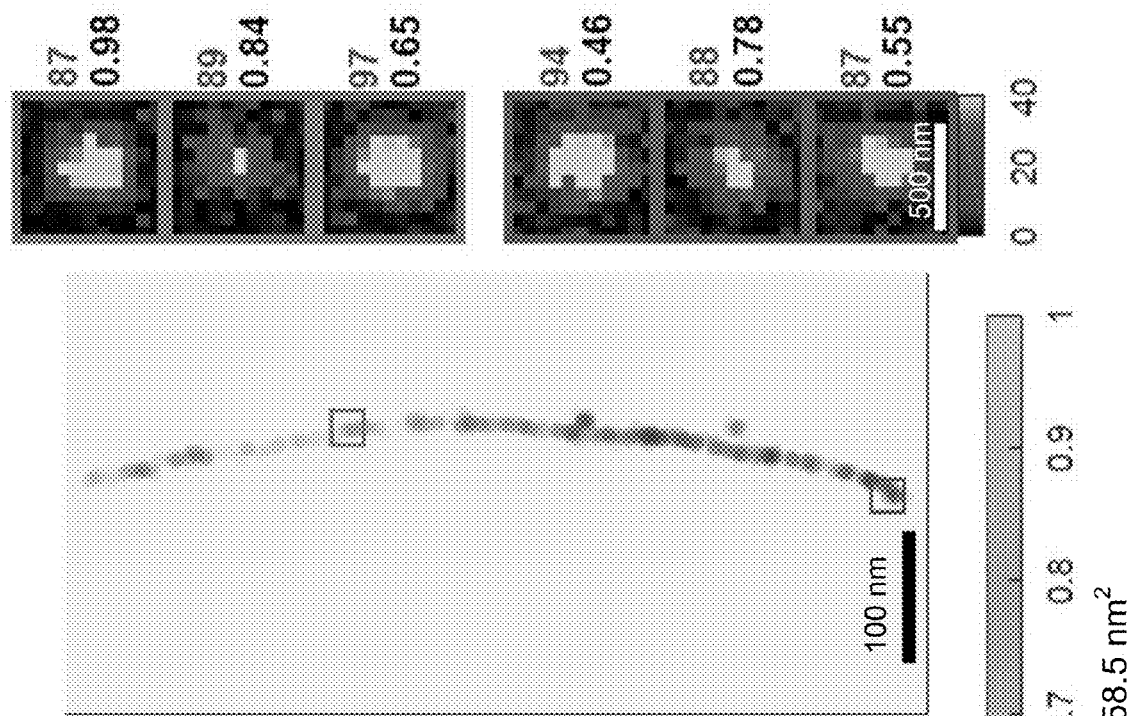
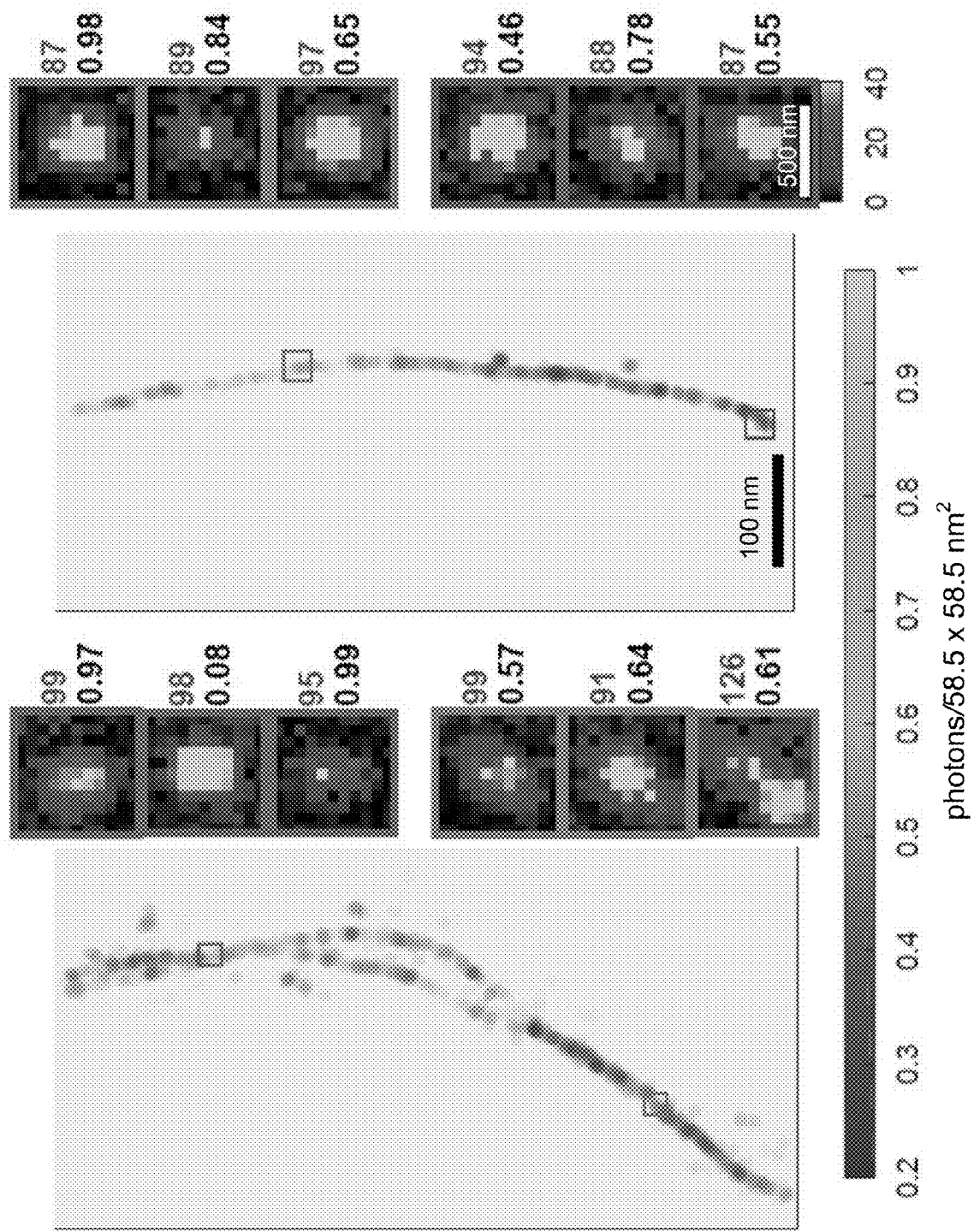
FIG. 14A
FIG. 14B

METHODS FOR QUANTIFYING AND ENHANCING ACCURACY IN MICROSCOPY USING MEASURES OF LOCALIZATION CONFIDENCE

CROSS-REFERENCE TO RELATED APPLICATIONS

This application claims priority from U.S. Provisional Application Ser. No. 62/880,495 filed on Jul. 30, 2019, which is incorporated herein by reference in its entirety.

STATEMENT REGARDING FEDERALLY SPONSORED RESEARCH OR DEVELOPMENT

This invention was made with government support under 1R35GM124858 awarded by the National Institutes of Health and 1653777 awarded by the National Science Foundation. The government has certain rights in the invention.

FIELD OF THE DISCLOSURE

The present disclosure generally relates to microscopy methods, and in particular the present disclosure relates to methods for quantifying and enhancing accuracy in microscopy using measures of localization confidence.

BACKGROUND OF THE DISCLOSURE

Single-molecule localization microscopy (SMLM) methods enable imaging at resolutions capable of visualizing nanoscale structures in biology and materials science. SMLM methods make use of repeated localizations of blinking fluorescent molecules to reconstruct high-resolution images of a target structure. SMLM methods estimate quasi-static features of the sample based on noisy individual images captured from a fluorescence microscope. Quantities captured from fluorescence microscope images, such as fluorophore positions (i.e., a map of fluorophore density), "on" times, and emission wavelengths and orientations, may influence the random blinking events that are captured within an SMLM dataset. Using a mathematical model of the microscope, SMLM reconstruction algorithms estimate the most likely set of fluorophore positions and associated brightnesses to construct a super-resolution image that is consistent with the observed noisy images.

One challenge associated with existing SMLM methodologies involves deriving a relationship between the statistical confidence in each measurement used in an SMLM algorithm with the algorithm's statistical estimates associated with the construction of the super-resolved image. Intuitively, one may interpret the SMLM reconstructions or data very differently if one knew the trustworthiness of each localization.

Existing performance metrics for assessing SMLM image quality can be categorized broadly into two classes: those that require knowledge of the ground truth positions of fluorophores, and those that operate directly on SMLM reconstructions alone, possibly incorporating information from other measurements (e.g., diffraction-limited imaging). One existing approach, the Jaccard index (JAC), measures localization accuracy, but has limited applicability as it requires exact knowledge of ground-truth molecule positions. Other proposed data-driven methods attempt to quantify the reliability of a localization in the absence of any knowledge of the ground-truth molecule positions. A drawback of these methods, however, is the reliance on a user to identify accurate localizations versus inaccurate ones, resulting in low throughput and poor accuracy in low signal-to-noise-ratio (SNR) datasets.

Existing methods of quantifying performance by analyzing SMLM reconstructions exploit some aspect of prior knowledge of the target structure or SMLM data. Fourier ring coefficient (FRC) utilizes correlations within SMLM datasets to measure image resolution with the expectation that SMLM reconstructions should be stable upon partitioning. However, FRC cannot detect localization errors that result in reconstruction artifacts. Other methods quantify errors between a pixelated SMLM image and a reference image assumed to represent ground truth. While these other methods provide summary or aggregate measures of performance, no existing method directly measures the accuracy of individual localizations. Knowledge of the accuracy of individual localizations is critical for harnessing fully the power of SMLM for scientific discovery.

Two fundamental insights of the SMLM measurement process are potentially useful in gaining additional insight into the confidence of each individual localization within an SMLM dataset. An analysis algorithm may combine highly accurate mathematical models of the imaging system with precise statistics of noise within each image to obtain a quantitative assessment of the confidence of each individual localization within an SMLM dataset without knowledge of the ground truth. With these confidences in hand, unreliable localizations may be filtered from SMLM images while retaining sufficient accurate localizations to resolve fine features within the SMLM images. The confidences calculated using this analysis algorithm may also be used to detect mismatches in the mathematical imaging model that create image artifacts, such as misfocusing of the microscope, dipole-induced localization errors, and the presence of optical aberrations.

BRIEF DESCRIPTION OF THE DISCLOSURE

In one aspect, an image analysis system for assessing an accuracy of at least one localization from a single molecule localization microscopy (SMLM) dataset containing a plurality of localizations. The system includes a computing device with at least one processor and a non-volatile computer-readable memory, the non-volatile computer-readable memory containing a plurality of instructions executable on the at least one processor. The plurality of instructions include a WIF component configured to calculate a Wasserstein-induced flux (WIF) value for each localization of the at least one localization, wherein each WIF value is indicative of the accuracy of each localization.

In another aspect, a computer-implemented method for assessing an accuracy of at least one localization from a single molecule localization microscopy (SMLM) dataset containing a plurality of localizations is disclosed. The method includes calculating, using a computing device, a Wasserstein-induced flux (WIF) value for each localization of the at least one localization, wherein each WIF value is indicative of the accuracy of each localization.

In another aspect, an SMLM analysis system for enhancing an accuracy of a single molecule localization microscopy (SMLM) dataset that includes a plurality of localizations is disclosed. The system includes a computing device with at least one processor and a non-volatile computer-readable memory, the non-volatile computer-readable memory containing a plurality of instructions executable on the at least one processor. The plurality of instructions include a WIF component configured to calculate a Wasserstein-induced flux (WIF) value for each localization of the SMLM dataset, wherein each WIF value is indicative of the accuracy of each localization. The WIF component is also configured to compare the plurality of WIF values to a threshold confidence value and to transform the SMLM dataset to a high-confidence SMLM dataset by discarding a first portion of the plurality of localizations with confidence values below the threshold confidence value.

Other objects and features will be in part apparent and in part pointed out hereinafter.

DESCRIPTION OF THE DRAWINGS

The patent or application file contains at least one drawing executed in color. Copies of this patent or patent application publication with color drawing(s) will be provided by the Office upon request and payment of the necessary fee.

Those of skill in the art will understand that the drawings, described below, are for illustrative purposes only. The drawings are not intended to limit the scope of the present teachings in any way.

FIG. 4C is a zoomed-in super-resolution image of Alexa Fluor 647-labeled microtubules within the rectangular region of FIG. 4B labeled C, D, E, as recovered by RoSE.

FIG. 4D is the zoomed-in super-resolution image of Alexa Fluor 647-labeled microtubules within the rectangular region of FIG. 4B labeled C, D, E, as recovered by TS.

FIG. 4E is a graph containing a histogram of confidences corresponding to localizations in FIG. 4C (RoSE, red) and to localizations in FIG. 4D (TS, green).

FIG. 5D is a histogram of localizations projected onto a transect line similar to that shown in FIG. 5C, top inset, and corresponding to the WLS-recovered image of FIG. 5A.

FIG. 5E is a histogram of localizations projected onto a transect line similar to that shown in FIG. 5C, top inset, and corresponding to the MLE-recovered image of FIG. 5B.

FIG. 5F is a histogram of localizations projected onto the transect line shown in FIG. 5C, top inset, and corresponding to the RoSE-recovered image of FIG. 5C.

FIG. 5G is a histogram of WIFs for all localizations shown in FIG. 5A; green regions denote localizations with confidence greater than 0.5.

FIG. 5H is a histogram of WIFs for all localizations shown in FIG. 5B; green regions denote localizations with confidence greater than 0.5.

FIG. 5I is a histogram of WIFs for all localizations shown in FIG. 5C; green regions denote localizations with confidence greater than 0.5.

FIG. 5J is a histogram of localizations with confidence greater than 0.5, projected onto a transect line similar to that shown in FIG. 5C, top inset, and corresponding to the WLS-recovered image of FIG. 5A.

FIG. 5K is a histogram of localizations with confidence greater than 0.5, projected onto a transect line similar to that shown in FIG. 5C, top inset, and corresponding to the MLE-recovered image of FIG. 5B.

FIG. 5L is a histogram of localizations with confidence greater than 0.5, projected onto the transect line shown in FIG. 5C, top inset, and corresponding to the RoSE-recovered image of FIG. 5C.

FIG. 12A is a histogram of WIFs for 600 isolated images of Alexa Flour 647 molecules (corresponding to FIG. 4A) using the uncalibrated model (gray) and the calibrated model (magenta).

FIG. 12B is an image containing a map of the PSF of an uncalibrated model used to produce the histogram of FIG. 12A.

FIG. 12C is an image containing a map of the PSF of a calibrated model used to produce the histogram of FIG. 12A.

FIG. 14A is a density plot of WIFs (sorted in ascending order) for bright localizations (>400 photons) for Nile red interactions with amyloid fibrils. Insets represent examples of images of Nile red molecules from the colored, boxed regions. Numbers next to insets indicate PSF width estimates in nm (red) and WIF or confidence (black).

FIG. 14B is a density plot of WIFs (sorted in ascending order) for bright localizations (>400 photons) for Nile red interactions with amyloid fibrils similar to FIG. 14A, but for a different fibril.

Figure 1A:
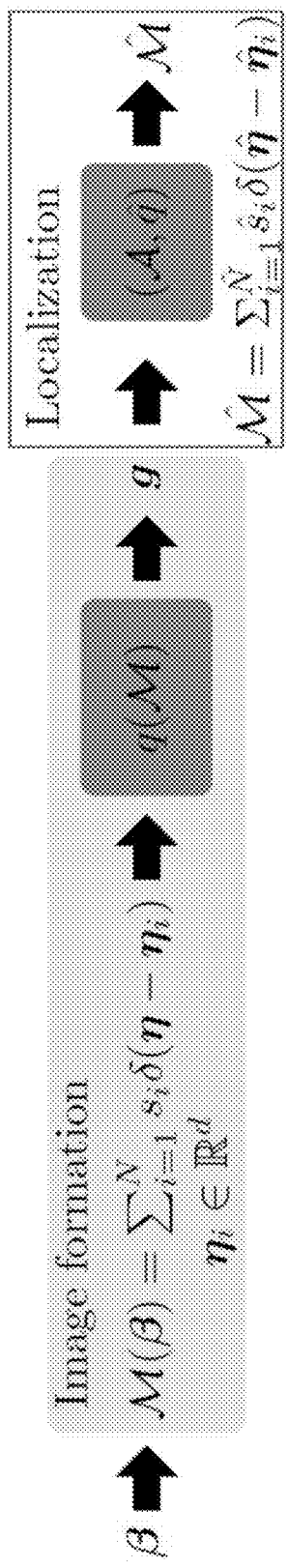
FIG. 1A is a flow chart summarizing a process of image formation and localization in single-molecule localization microscopy (SMLM) in accordance with one aspect of the disclosure. β is a hidden variable that describes parameters that affect molecular fluorescence, including blinking rates, molecular density, etc. For each frame, activated molecules are represented by $\mathcal{M}$ in which N, $s_i$, and $\eta_i$ denote the number of molecules, photons emitted, and related physical parameters of the $i^{th}$ molecule, respectively. The variable q denotes the PSF of the imaging system that can vary with $\mathcal{M}$. $g \in \mathbb{R}^m$ represents the vectorized image consisting of m pixels quantifying the number of photons detected. Localization refers to estimating $\hat{\mathcal{M}}$ from g via an algorithm A that uses a PSF model $\hat{q}$.

There are shown in the drawings arrangements which are presently discussed, it being understood, however, that the present embodiments are not limited to the precise arrangements and are instrumentalities shown. While multiple embodiments are disclosed, still other embodiments of the present disclosure will become apparent to those skilled in the art from the following detailed description, which shows and describes illustrative aspects of the disclosure. As will be realized, the invention is capable of modifications in various aspects, all without departing from the spirit and scope of the present disclosure. Accordingly, the drawings and detailed description are to be regarded as illustrative in nature and not restrictive.

DETAILED DESCRIPTION OF THE INVENTION

Single-molecule (SM) super-resolution microscopy relies on localizing individual molecules to reconstruct high-resolution images of cellular structures. These images, represented by points in a multidimensional space, contain nanoscale, quantitative information regarding the organization, interaction, and dynamics of molecular entities with respect to target structures that need to be estimated robustly. Typically, the accuracy of individual localizations has been quantified through simulated data or other secondary image modalities. Existing methods, however, do not quantify statistical confidence of each localization affected by hidden parameters within a specific dataset to facilitate the unbiased recovery of biophysical parameters from noisy SM images. By measuring the stability of a localization, using tens of pixels, the confidence of individual localizations within an experimental dataset may be accurately estimated. In various aspect, a general method, termed Wasserstein-induced flux (WIF) is described below and used to quantify the accuracy of various reconstruction algorithms directly using experimental data derived from SM images derived from microtubules and fibrillar structures. As illustrated below, the estimated confidences or WIFs can be used to evaluate various computational imaging models, enhance the accuracy and resolution of reconstructed structures, and discover sample heterogeneity due to hidden molecular parameters.

In various aspects, the disclosed method of assessing the confidence of individual localizations within an SMLM image makes use of the principles and operation of Wasserstein-induced flux (WIF), whose underlying algorithm is built on the theory of optimal transport. WIF reliably quantifies confidence of individual localizations within an SMLM images for a certain mathematical imaging model. In one aspect, the confidences yield a consistent measure of localization accuracy under various imaging conditions, such as changing molecular density and optical aberrations, without knowing the ground-truth positions a priori. In various aspects, the WIF confidence map outperforms other image-based methods in detecting artifacts in high-density SMLM while revealing fine, but accurate features of the target structure. In one non-limiting example, presented below, the accuracy of various algorithms on real SMLM images of microtubules are compared. In another non-limiting example, also presented below, the benefits of localization confidences to improve reconstruction accuracy and image resolution in super-resolution Transient Amyloid Binding (TAB) imaging under low SNR are demonstrated, in which the disclosed WIF methods reveal heterogeneities in the interaction of Nile red molecules with amyloid fibrils.

In various aspects, WIF is a computational method that utilizes basic knowledge of imaging system and noise characteristics to robustly measure statistical confidence of each localizations within an SMLM dataset. In one aspect, WIF may be used to benchmark suitability of SMLM algorithms for a particular dataset. In another aspect, WIF may be used to validate various imaging models and to identify sample parameters (e.g., defocus, dipole emission effects) that impact imaging data and reconstruction accuracy. Like any other physical quantity, the effectiveness of WIF is limited any one or more of a plurality of factors including, but not limited to, the accuracy in calibrating an underlying model of the imaging system, and the signal to noise ratio (SNR) of a given SMLM experiment.

WIF exhibits at least several advantages over existing metrics for quantifying reconstruction accuracy in experimental SMLM data. WIF does not require labeled training data to judge trustworthiness of image features but instead makes use of a basic model of the imaging system. WIF does not need knowledge of ground truth localizations, which would be prohibitive in most imaging applications. WIF obviates the need for a secondary imaging modality for comparison purposes and is therefore more robust (does not require alignment between modalities) and more sensitive to discrepancies within the SMLM dataset itself (not ensemble-averaged). WIF exploits a unique advantage of SMLM over other super-resolution optical methodologies (e.g., structured illumination and non-linear RESOLFT/STED in that imaging of the entirety (peak and spatial decay) of each SM PSF, often using tens of pixels, enables the stability of each localization to be tested rigorously against computational imaging and noise models, as demonstrated herein.

WIF is a useful tool for SMLM community as it offers a unique capability in quantifying localization accuracy and heterogeneity in experimental SMLM datasets. In one aspect, WIF may be used for online tuning of SMLM experiments (e.g., activation density, labeling strategy, fluorophore concentration) to maximize performance. In an additional aspect, WIF also offers a reliable means to detect structural features/heterogeneities, therefore enabling the discovery of new physical parameters. While the majority of existing methods for training neural networks in SMLM utilize simulated data or experimental data with limited control, the discriminative power of WIF may be used to train these networks directly on experimental data in another aspect. In another additional aspect, WIF can be readily extended to other SMLM techniques such as 3D or orientation imaging using calibrated models.

SMLM Modeling

In SMLM, a variety of physical influences on stochastic fluorescence emission are modeled using a hidden variable $\beta$ (see FIG. 1A). For example, $\beta$ can encode where molecules activate, how densely they are activated, or how freely they rotate. For each frame, we may represent a set of N activated molecules as:

$$\mathcal{M} = \sum_{i=1}^{N} s_i \delta(\eta - \eta_i) \quad \text{Eqn. [1]}$$

where $s_i > 0$ and $\eta_i \in \mathbb{R}^d$ represent the brightness and related physical parameters (i.e., a d-dimensional object space comprising position, orientation, etc.) of the $i^{th}$ molecule, respectively.

In general, N, $s_i$, and $\eta_i$ are random variables whose probability distributions depend on $\beta$. The measured images of molecular blinks $g \in \mathbb{R}^m$ (e.g., m pixels of photon counts captured by a camera) are assumed to be generated according to a statistical model with the negative log likelihood $\mathcal{L}(q, \mathcal{M}; g)$ (FIG. 1A). Here, q is the point spread function (PSF) that can depend on $\mathcal{M}$.

In typical SMLM methods, an algorithm A equipped with a PSF model, $\hat{q}$, is used to estimate molecular positions. The output of such a localization algorithm may be represented by:

$$\hat{\mathcal{M}} = \sum_{i=1}^{N} \hat{s}_i \delta(\eta - \hat{\eta}_i) \quad \text{Eqn. [2]}$$

where $\hat{\eta}_i = \hat{r}_i$ represents the estimated positions.

Generally, $\beta$ affects the accuracy with which an algorithm localizes molecules, and uncertainty in $\beta$ can cause degraded image resolution or even bias in estimating $\mathcal{M}$. This uncertainty may arise from miscalibration of the PSF model due to optical aberrations as well as neglecting the full molecular parameters $\eta_i$ that affect the PSF q, e.g., the dipole emission pattern of fluorescent molecules. A more subtle uncertainty may arise for difficult measurements even with a well-calibrated PSF, e.g., overcounting or undercounting molecules due to image overlap.

Figure 1B:
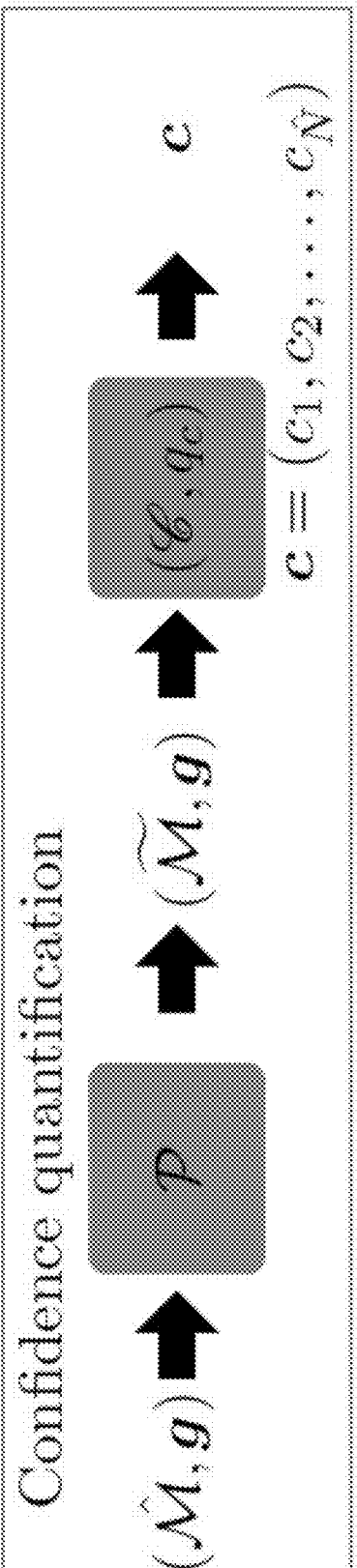
FIG. 1B is a flow chart summarizing a confidence quantification framework for the single-molecule localization method described in FIG. 1A. P is a perturbation operator that applies a small distortion to $\hat{\mathcal{M}}$. The perturbed molecules $\hat{\mathcal{M}}$ and the measurements are then analyzed via a confidence analysis algorithm C that uses its own PSF model $q_c$. The estimated confidences are represented by $c=(c_1, c_2 \ldots c_N)$ taking values in [−1, 1] with 1 and −1 denoting the most and the least confident molecules, respectively.

Illustrative examples of various forms of uncertainty are provided below that demonstrate the shortcomings of current approaches at quantifying localization confidence. As $\beta$ is often not explicitly provided, a degree of uncertainty/confidence in truly representing $\mathcal{M}$ may be assigned to each localization (FIG. 1B). For 2D SMLM, the fitted width $\hat{\sigma}$ of the standard PSF is commonly used to quantify the confidence of a localization. If $\hat{\sigma}$ is significantly smaller or larger than expected compared to $\hat{q}$, then the corresponding localization has low confidence. However, such a strategy fails when a localization is not a single molecule (SM), but two or more closely-spaced ones.

Figure 1C:
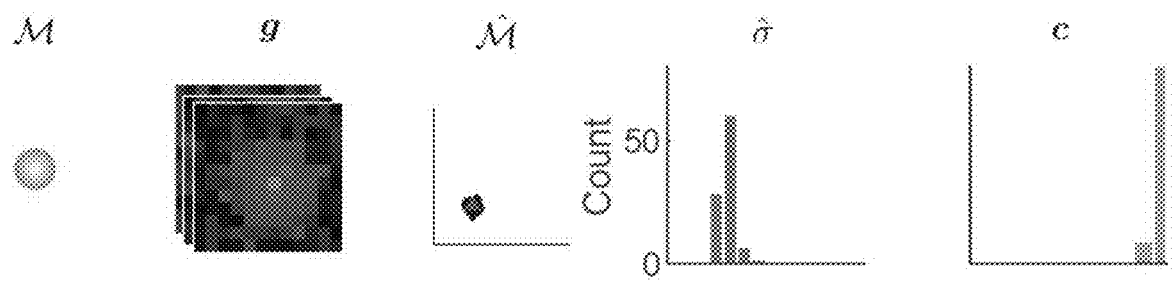
FIG. 1C contains a series of images and graphs summarizing an example of localizing and quantifying confidence of an SM using 100 simulated images (see map in second column) of an isotropic molecule (see image in first column) that were produced and analyzed using ThunderSTORM (TS). The scatter plot (see third column) summarizes the localizations (black dots) and the true positions of molecules (red triangles). The black histogram (see fourth column) summarizes the fitted widths of the PSF ($\hat{\sigma}$) that are estimated by TS. The magenta histogram (see fifth column) summarizes the estimated confidences using the method in accordance with one aspect of the disclosure.
Figure 1D:
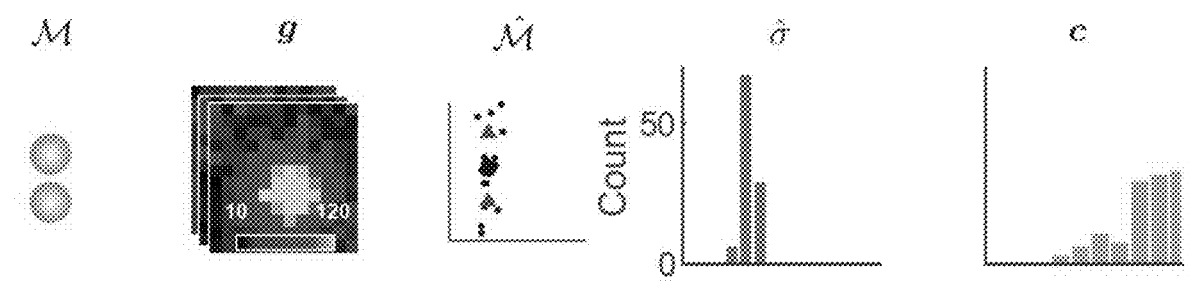
FIG. 1D contains a series of images and graphs similar to those of FIG. 1C summarizing a second example of localizing and quantifying confidence of two closely-spaced molecules (see image in first column).

As an illustrative example, two scenarios are considered: an isotropic molecule located at (0, 0, 0) (FIG. 1C) and two close molecules located at (0, 0, 0) and (0, 70 nm, 0) (FIG. 1D). ThunderSTORM (TS) was used to localize the molecules, which also provides fitted widths $\hat{\sigma}$. Due to significant image overlap, TS typically localizes one molecule for both scenarios, such that in the latter scenario, the estimated positions exhibit a significant deviation from the true ones (FIGS. 1C and 1D). However, the distributions of $\hat{\sigma}$ in both cases are virtually the same, suggesting that $\hat{\sigma}$ is a poor method for quantifying confidence and detecting localization errors due to overlapping molecules (FIGS. 1C and 1D).

Figure 1E:
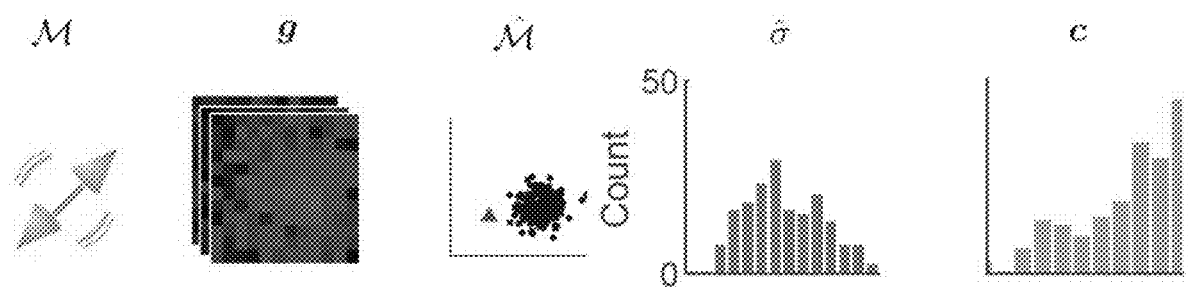
FIG. 1E contains a series of images and graphs similar to those of FIGS. 1C and 1D summarizing a third example of localizing and quantifying confidence of a dim molecule (see image in first column).
Figure 1F:
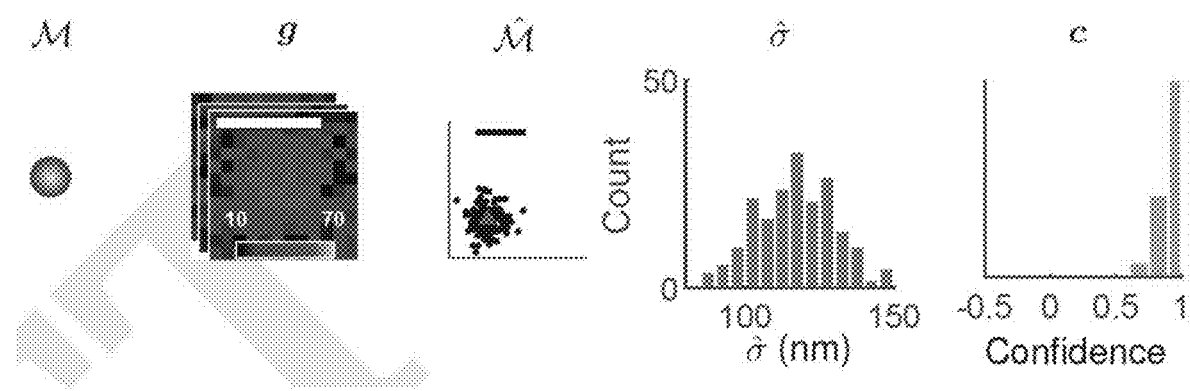
FIG. 1F contains a series of images and graphs similar to those of FIGS. 1C and 1D summarizing a fourth example of localizing and quantifying confidence of an anisotropic and defused molecule (see image in first column).

More fundamentally, mismatches in SMLM between model and measurement generally depend on $\beta$ in a way that cannot be quantified via simple image-based features such as PSF width. By way of non-limiting example, this situation is illustrated by localizing a rotationally fixed molecule located at (0, 0, 200 nm). The anisotropic emission pattern induces a significant bias in TS localizations (FIG. 1E). The distribution of fitted widths is noisy due to photon-shot noise and broadening of the PSF (FIG. 1E). Unfortunately, this rather wide distribution is comparable to that of a dim, isotropic molecule whose localizations have no systematic bias (FIG. 1F).

These observations suggest that quantifying subtle model mismatches in SMLM and, thus, localization confidence, requires a new mathematical "metric" generated by an algorithm as described below in various aspects. This metric may be used to quantify the confidence of each localization in $\hat{\mathcal{M}}$ produced by any algorithm, given the measurements g (FIG. 1B). In various aspects, the algorithm assigns higher confidence to localizations that are better supported by the measurements and a calibrated PSF model.

WIF Method

Figures 7A, 7B:
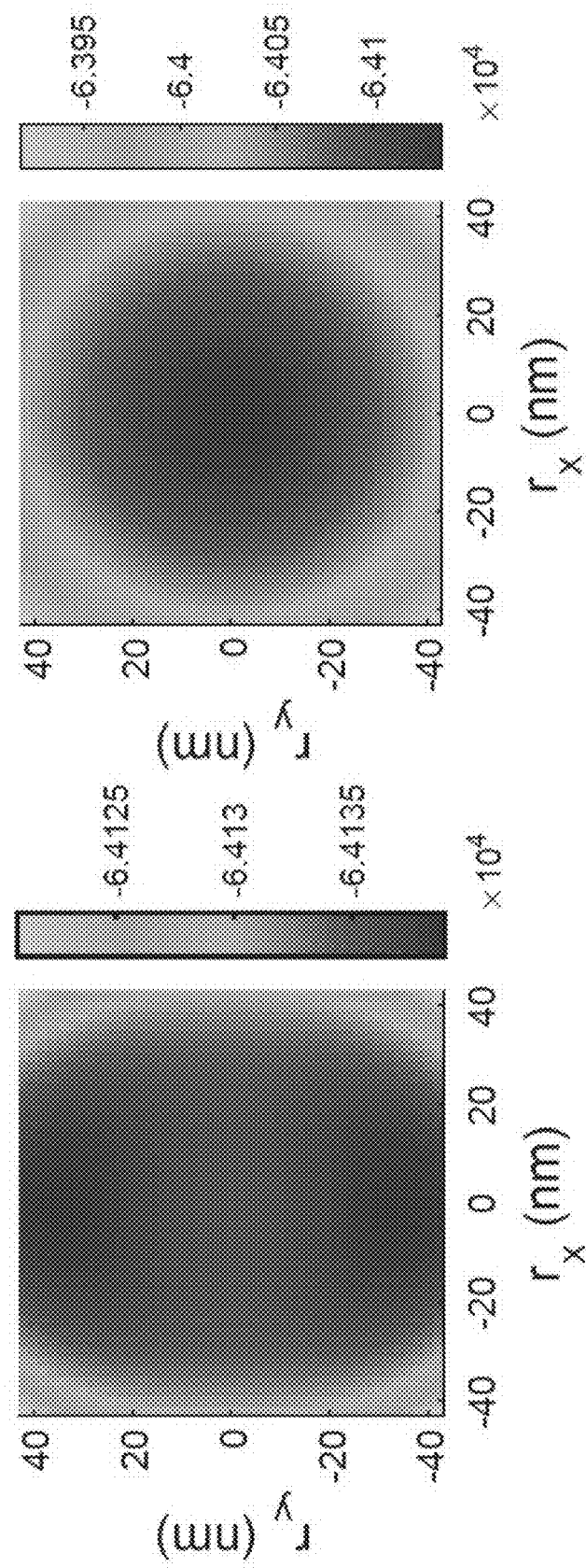
FIG. 7A is a map of the expected, negative Poisson log likelihood for a model parameterized by two equally bright molecules, which are located at $(r_x, r_y)$ and $(-r_x, -r_y)$. Ground-truth molecules are located at (0, 35), (0, 35) nm with equal brightness of 2000 photons. Noisy images were generated according to a symmetric Gaussian PSF with $\sigma=0.21\lambda/NA=100$ nm, and background was set to 20 photons per pixel.
FIG. 7B is a map of the expected, negative Poisson log likelihood for a model parameterized by a single molecule located at $(r_x, r_y)$ produced using a process similar to the process associated with the map of FIG. 7A.

In simplest form, the localization task may be formulated as the minimization of the negative log-likelihood $\mathcal{L}$ of observing an unknown number of molecules, N, each with a photon count $s_i$ and a position $r_i$. If N is known, then the localization task reduces to simultaneously fitting $\{s_1, r_1 \ldots s_N, r_N\}$. However, if N is not known a priori, the localization is formulated as a non-convex optimization. Non-convexity renders many algorithms susceptible to being practically trapped in a saddle point of the negative log-likelihood landscape, while correct localizations are associated with global minima within the negative log-likelihood landscape. In the example of localizing two closely-spaced molecules described above (FIG. 1D), almost all position estimates lie near (0, 35 nm), which exactly matches the center position of the two true molecules. At the same time, the photon count estimates are twice as large as the ground-truth photons, and this point represents a saddle point of the negative log-likelihood (FIG. 7A).

The saddle points associated with the negative log-likelihood landscape may introduce instabilities with respect an algorithm's ability to identify a minimum of the negative log likelihood for well-chosen perturbations of a given localization. For localizations known to be accurate, the negative log-likelihood surface has a convex curvature as a function of the estimated position of a molecule. Consequently, local perturbations of position as well as photon count of a particular estimated molecule will most likely result in a revised localization very "close" to the unperturbed position. On the other hand, for a localization thought to be unreliable, the negative log-likelihood landscape are expected to change arbitrarily within a local neighborhood (FIG. 7B). As a result, re-localizing using local perturbations of position as well as photon count of a particular estimated molecule most likely will alter the original localization. This observed stability in the position of a molecule may be used as a quantitative measure of confidence in an SMLM localization. In various aspects, the enhanced stability associated with accurate localizations may be used as a basis for a robust method to measure this stability, and therefore statistical confidence, of each localization within an SMLM dataset and reconstructed image.

Localization Stability for Measuring Confidence

Intuitively, stability is a measure of discrepancy between a source point and a perturbed instance of this point after following a certain trajectory. By way of non-limiting example, consider a strongly convex, differentiable function $f$ over some open set $\Omega \in \mathbb{R}$ taking its minimum at $\omega^* \in \Omega$. Because the focus herein is to identify minimizers of some functional, as they are in a sense the best "fit" to the ground truth, the confidence of a point estimate $\hat{\omega}$ as a measure is representative of its distance to $\omega^*$. Since $\omega^*$ is unknown, it is desired to measure the confidence of $\hat{\omega}$ without knowing $\omega^*$. To this end, a simple single-step gradient-descent update is constructed and a representation of stability to quantify the said confidence is determined below.

Consider the following gradient descent update given by the gradient-descent step with a small step size $\epsilon > 0$:

$$\omega_1 = \omega_0 - \epsilon \nabla f(\omega_0), \omega_0 = \mathcal{P}(\hat{\omega}) \quad \text{Eqn. [3]}$$

in which $\mathcal{P}(\hat{\omega}) = \hat{\omega} + (1-2e)\nabla\hat{\omega}$ with e~Bern(0.5) and perturbation distance $\Delta\omega = |\hat{\omega} - \omega^0|$.

If the estimate $\hat{\omega}$ is stable, we have $|\omega_1 - \hat{\omega}| < |\omega_0 - \hat{\omega}|$ as a result of our gradient-descent update, while for an unstable estimate, we can find a perturbation that results in $|(\omega_1 - \hat{\omega})| > |\omega_0 - \hat{\omega}|$. Since $\omega^*$ is the minimizer of $f$, $|\omega_1 - \hat{\omega}| < |\omega_0 \hat{\omega}|$ is obtained for any local perturbation of $\omega^*$. The gradient vector field pushes the perturbed point $\omega_0$ toward $\omega^*$. Consequently, the confidence of $\hat{\omega}$ may be quantified by measuring the average convergence of $\omega_0$ toward $\hat{\omega}$.

In various aspects, the confidence of a point $\hat{\omega}$ may be defined as:

$$c = \frac{\mathbb{E}[((\hat{\omega} - \omega_0) \cdot (\omega_1 - \omega_0)) \cdot |\epsilon \nabla f(\omega_0)|]}{\mathbb{E}[|\epsilon \nabla f(\omega_0)|]} \quad \text{Eqn. [4]}$$

The parameter c in Eqn. [2] represents the normalized gradient flux. In various aspects, a stable point has a maximum inward gradient flux (c=1), while an unstable point has some degree of outward gradient flux (c<1). Thus, c measures a desirable confidence score for any point in $\Omega$ without knowing $\omega^*$. As an example, for $f(\omega) = \omega^2$ thus implying $\omega^* = 0$, we find:

$$c = \frac{2\Delta\omega}{|\hat{\omega} - \Delta\omega| + |\hat{\omega} + \Delta\omega|} \quad \text{Eqn. [5]}$$

Using the above equation, $\hat{\omega} = \omega^* = 0$ is the most stable point with highest confidence, and the further away from 0, the worse the confidence.

In various aspects, a recursive variational form of Eqn. [1] may be expressed as:

$$\omega_k = \underset{\omega \in \Omega}{\mathrm{argmin}}\left\{\frac{1}{2}\|\omega - \omega_{k-1}\|_2^2 + \epsilon_k f(\omega)\right\}, k > 0 \quad \text{Eqn. [6]}$$

Informally, Eqn. [4] defines a discrete trajectory $\{\omega_k\}$ by minimizing $f$ while preserving the "local Euclidean distance" constraint. In fact, in the limit of $\epsilon_k \to 0$, i.e., considering continuous trajectories, the Cauchy Problem is recovered, that is:

$$\frac{d\omega(t)}{dt} = -\nabla f(\omega(t)) \quad \text{Eqn. [7]}$$

which defines the evolution of $\omega \in \Omega$ from an initial point $\omega_0$. The resulting curve $\{\omega(t)\}_{t \geq 0}$ is called a gradient flow.

Wasserstein-Induced Flux

In SMLM, variables of interest are expressed as $\mathcal{M} = \Sigma_{i=1}^N s_i \delta(r - r_i)$ where $s_i > 0$ and $r_i \in \mathbb{R}^2$ denote brightness and position of the $i^{th}$ molecule, respectively.

Mathematically, these molecular variables are elements of the space of non-negative, finite measures denoted by $M(\mathbb{R}^2)$, and the above analysis by necessity extends beyond scalar variables to measures in $M(\mathbb{R}^2)$.

In various aspects, the theory of optimal transport is used to extend this analysis. Without being limited to any particular theory, the optimal transport distance between any two measures is roughly the minimum cost of transporting mass from one to the other as measured via a ground metric. The Wasserstein distance is particularly suitable, because its ground metric is simply the Euclidean distance. The type-2 Wasserstein distance between two measures $\mathcal{S}, \mathcal{I} \in M(\mathbb{R}_2)$ is defined as:

$$W(\mathcal{S}, \mathcal{I}) = \min_{\pi \in \Pi(\mathcal{S}, \mathcal{I})} \sqrt{\int_{\mathbb{R}^2 \times \mathbb{R}^2} \|r - r'\|_2^2 d\pi(r, r')}; \quad \text{Eqn. [8]}$$

where $\Pi(\mathcal{S}, \mathcal{I})$ is the set of all couplings or transportation plans between $\mathcal{S}$ and $\mathcal{I}$ satisfying the mass conservation constraint.

Equipped with Wasserstein distance, the recursive dynamics of Eqn. [6] may be rewritten as:

$$\mathcal{S}_k = \underset{\mathcal{S} \in M(\mathbb{R}^2)}{\mathrm{argmin}}\left\{\frac{1}{2}W^2(\mathcal{S}, \mathcal{S}_{k-1}) + \epsilon_k \mathcal{L}(\mathcal{S})\right\}, k > 0; \quad \text{Eqn. [9]}$$

where $\mathcal{L}: M(\mathbb{R}^2) \to \mathbb{R}$ is the negative Poisson log-likelihood, which is a convex functional.

In various aspects, Poisson log likelihood considers a set M of N molecules represented as described in the above equation, where $s_i \geq 0$ and $r_i \in \mathbb{R}^3$ denote the $i^{th}$ molecules' brightness (in photons) and position, respectively. The resulting intensity $\mu_j$, that is, the expected number of photons detected on camera, for each pixel j can be written as:

$$\mu_j = \Sigma_{i=1}^{N}\{s_i q_j(r_i) + b_j\}, j \in \{1, \ldots, m\} \quad \text{Eqn. [10]}$$

where $q_j(r_i)$ represents the value of the PSF q for the $i^{th}$ molecule positioned at the $j^{th}$ pixel; $b_j$ denotes the expected number of background photons at the $j^{th}$ pixel.

If we denote $g \in \mathbb{R}^m$ as m pixels of photon counts captured by a camera, the negative Poisson log likelihood is then given by $$\mathcal{L}(q, \mathcal{M}, g) = \Sigma_{j=1}^{m}\{\mu_j - g_j \log(\mu_j)\} \quad \text{Eqn. [11]}$$

Without being limited to any particular theory, the analysis described above obtains a useful representation of point stability in the space of measures. Since stability is coupled with evolution of the measures, the properties of Wasserstein gradient flows, i.e., $\{S_t\}_{t \geq 0}$ may be further analyzed. One result from the theory of Wasserstein gradient flow asserts that if $S$ has a smooth density, there exists a unique transport map $T_k:M(\mathbb{R}^2) \to M(\mathbb{R}^2)$, such that $$W_2^2(S_k, S_{k-1}) = \int_\Omega |T_k(r) - r|^2 dS_{k-1}(r) \quad \text{Eqn. [12]}$$

This result indicates that the mass-weighted displacement distance for the transport plan is given by the type-2 Wasserstein distance. In addition, the backward velocity field $v(r)$, i.e., the ratio between the displacement $T(r) - r$ and the time step $\in_k$, obtained in the transport of $S_k$ to $S_{k-1}$ is given by:

$$\nabla\left(\frac{\delta \mathcal{L}}{\delta S}(S)\right)(r)(\text{in the limit of } \varepsilon_k \to 0); \quad \text{Eqn. [13]}$$

The functional $$\frac{\delta \mathcal{L}}{\delta S}(S)$$

may also be referred to as the first variation of $\mathcal{M}$. In various aspects, the gradient flows satisfy the continuity equation:

$$\delta_t S - \nabla \cdot \left(S \nabla \left(\frac{\delta \mathcal{L}}{\delta S}(S)\right)\right) = 0 \quad \text{Eqn. [14]}$$

The divergence theorem may be invoked to define the Wasserstein-induced flux (WIF) corresponding to $v$ as follows:

$$WIF \triangleq \int_v \nabla \cdot \left(S \nabla \left(\frac{\delta \mathcal{L}}{\delta S}(S)\right)\right) dv = \int_s \left(S \nabla \left(\frac{\delta \mathcal{L}}{\delta S}(S)\right) \cdot n\right) dS \quad \text{Eqn. [15]}$$

where $S$ and n represent the closed surface on the boundary of $v$ and its normal vector, correspondingly.

In one aspect, WIF serves as a mathematically-grounded representation for stability that allows for incorporating the local interactions of point sources. It is to be noted that the source molecules may vary in brightness; photons are the conserved mass under this perturbation. To avoid difficulty in interpreting WIFs of different scales, WIF is normalized with respect to the flux associated with an isolated source in $v$. Thus, WIF takes on values within $[-1, 1]$ with a value of 1 representing the most confident point.

As described above, in transporting $S_1$ to $S_0$ the gradient field may be written $$\nabla\left(\frac{\delta \mathcal{L}}{\delta S}(S)\right)(r) = v(r) \approx \frac{T_1(r) - r}{\epsilon} \quad \text{Eqn. [16]}$$

This equivalence effectively provides a strategy to approximate WIF by finding an estimate of $T_1$, referred to herein as the transport map. Typically, it is computationally expensive to solve for the infinite-dimensional measure $S_1$. In addition, molecules are in actuality point sources, which means that the object space $M(\mathbb{R}^2)$ consists of discrete measures and not measures with smooth densities. Consequently, absolutely continuous measures are approximated with a set of discrete measures. Even though the uniqueness condition of the transport map requires measures with smooth densities, even with these approximations, the WIF dynamics described herein mirror the corresponding dynamics predicted by Eqn. [6].

In various aspects, an efficient, iterative algorithm was designed to approximately compute $T_1$, which ultimately enabled the computation of WIF, as described below.

Referring again to previous examples (FIGS. 1C, 1D, 1E, and 1F), when estimated localizations are close to the ground-truth positions, their estimated confidences or WIFs are concentrated close to 1 (FIGS. 1C and 1F). On the other hand, for inaccurate estimates, localization confidences become significantly smaller, implying their unreliability (FIGS. 1D and 1E). Note that knowledge of the ground truth molecule location is not needed to compute these confidence values.

Computing WIF

In one aspect, to quantify the confidence of a localization in the absence of ground truth data, an estimate of $T_1$ may be calculated that characterizes the transport of mass (photons in this case) between the perturbed measure $S_0$ and $S_1$ as expressed as a solution to the following problem:

$$S_1 = \underset{S \in M(\mathbb{R}^2)}{\text{argmin}}\left\{\frac{1}{2}W^2(S, S_0) + \epsilon \mathcal{L}(S_1)\right\} \quad \text{Eqn. [17]}$$

Given such an estimate, the vector field $$S\nabla\left(\frac{\delta \mathcal{L}}{\delta S}(S)\right)$$

necessary for computing WIF may be calculated according to:

$$WIF = \int_\mathcal{G} \left(S\nabla\left(\frac{\delta \mathcal{L}}{\delta S}(S)\right) \cdot n\right) dS \quad \text{Eqn. [18]}$$

where $\mathcal{G}$ represents the closed surface on the boundary of a chosen perturbation volume V.

In various aspects, discrete measures (i.e., point sources) may be considered to obtain a discrete version of the WIF expression of Eqn. [18]. In one aspect, to perturb a set of localizations or point sources, the underlying object space, $\mathbb{R}^2$ may be discretized into a square grid of N points separated by $2\rho$. We denote $\mathcal{G}$ and $\{r\mathcal{G}_i\}_{1:N}$ as the grid and its points, respectively. Assuming that any two point sources are separated by at least $\rho$, reparameterization may be invoked such that any discrete measure $\mathcal{M} = \sum_{i=1}^{N} s_i \delta(r-r_i)$, that is, a collection of N point sources located at $\{r_1, \ldots, r_N\}$ with brightness $\{s_1, \ldots, s_N\}$ may be written as:

$$\mathcal{M} = \sum_{i=1}^{N} s_{[i]} \delta(r - (r_{\mathcal{G}_{[1]}} + \Delta r_{[i]}))$$  Eqn. [19]

where the grid point index $[i] \in \{1, \ldots, \tilde{N}\}$ and the distance from the point source to the nearest grid point $\|\Delta r_{[i]}\|_2 \leq \rho$.
Perturbing a Set of Localizations.

$\hat{\mathcal{M}} = \sum_{i=1}^{\hat{N}} \hat{s}_i \delta(r-\hat{r}_i)$ is an expression for the localization estimates corresponding to $\hat{N}$ molecules to be subjected to a confidence mapping algorithm. These estimates may be equivalently represented using a constructed grid as expressed by:

$$\hat{\mathcal{M}} = \sum_{i=1}^{\hat{N}} \hat{s}_{[i]} \delta(r - (\hat{r}_{\mathcal{G}_{[1]}} + \Delta \hat{r}_{[i]}))$$  Eqn. [20]

It is assumed that $\hat{s} = \sum_{i=1}^{\hat{N}} \hat{s}_{[i]}$ equals the total mass of the ground-truth sources. The perturbed measure $M_0$ may be defined as $$\mathcal{P}(\hat{\mathcal{M}}) = \mathcal{M}_0 \triangleq \sum_{i=1}^{\hat{N}} (\sum_{j=1}^{8} \hat{s}_{[i,j]} \delta(r - \hat{r}_{\mathcal{G}_{[i,j]}}))$$  Eqn. [21]

where $\hat{s}_{[i,j]} = \hat{s}_{[i]}/8$.

Eqn. [21] states that for each point source in $\hat{\mathcal{M}}$, the point source's photons are redistributed to 8 point sources located at its closest neighboring points represented as $\{\hat{r}_{\mathcal{G}_{[i,1]}}, , \hat{r}_{\mathcal{G}_{[i,8]}}\}$. For convenience, these points may be denoted as Nh($[i]$)=$\{[i, 1], \ldots, [i, 8]\}$. As formulated above, this perturbation has a symmetric distribution around the original point sources.

In one aspect, a unique map that describes the transport of mass between two measures may be produced by directly regularizing mass transportation. This regularization may be enabled in the form of a local constraint on M as expressed by:

$$\mathcal{C} = \{(s_i, \Delta r_i) \|\Delta r_i\|_2 \leq \rho, i \in supp(\mathcal{M}_0)\}$$  Eqn. [22]

where supp($\mathcal{M}_0$) is defined as $\{j \in \{1, \ldots, \tilde{N}\} | j \in \cup_{i=1}^{\hat{N}} \text{Nh}([i])\}$.

Effectively, this constraint forces each point to be transported along a unique trajectory in a local neighborhood of the unperturbed source. Given the above constraint, the following regularized one-step dynamical process may be solved:

$$\mathcal{M}_1 = \underset{\mathcal{M} \in M(\mathbb{R}^2) \cap C}{\operatorname{argmin}} \left\{ \frac{1}{2} \mathbb{W}^2(\mathcal{M}, \mathcal{M}_0) + \epsilon \mathcal{L}(\mathcal{M}) \right\}$$  Eqn. [23]

In order to solve Eqn. [23] for $\mathcal{M}_1$ efficiently, $\mathbb{W}^2(\mathcal{M}, \mathcal{M}_0)$ may be bound from above with a group-sparsity norm. Such a relaxation allows the derivation of a convex program for approximating $\mathcal{M}_1$.
Bounding the Square of Wasserstein Distance.

In one aspect, for all $\mathcal{M} \in M(\mathbb{R}^2) \cap \mathcal{C}$, $\mathbb{W}^2(\mathcal{M}, \mathcal{M}_0)$ may be bound from above using:

$$\sum_{i=1}^{\hat{N}} \sum_{j=1}^{8} \sqrt{s_{[i,j]}^2 + s_{[i,j]}^2 \|\Delta r_{[i,j]}\|_2^2}$$  Eqn. [24]

so long as $\|\Delta r_{[i,j]}\|_2^2 \leq \sqrt{1 + \|\Delta r_{[i,j]}\|_2^2}$.

This assumption may be easily satisfied by appropriately scaling $\rho$ in the object model.

Using the reparameterization method illustrated above in Eqn. [24], any measure $\mathcal{M} \in M(\mathbb{R}^2) \cap \mathcal{C}$ can be represented as $$\mathcal{M} = \sum_{i=1}^{\hat{N}} (\sum_{j=1}^{8} s_{[i,j]} \delta(r - (r_{\mathcal{G}_{[i,j]}} + \Delta r_{[i,j]})))$$  Eqn. [25]

such that $\sum_{i=1}^{\hat{N}} \sum_{j=1}^{8} s_{[i,j]} = \hat{s}$.
Combining the above results in the following:

$$\mathbb{W}^2(\mathcal{M}, \mathcal{M}_0) \leq \sum_{i=1}^{\hat{N}} \sum_{j=1}^{8} s_{[i,j]} \|\Delta r_{[i,j]}\|_2^2$$  Eqn. [26]

$$\mathbb{W}^2(\mathcal{M}, \mathcal{M}_0) \leq \sum_{i=1}^{\hat{N}} \sum_{j=1}^{8} s_{[i,j]} \sqrt{1 + \|\Delta r_{[i,j]}\|_2^2}$$  Eqn. [27]

$$\mathbb{W}^2(\mathcal{M}, \mathcal{M}_0) \leq \sum_{i=1}^{\hat{N}} \sum_{j=1}^{8} \sqrt{s_{[i,j]}^2 + s_{[i,j]}^2 \|\Delta r_{[i,j]}\|_2^2}$$  Eqn. [28]

where the first inequality in Eqn. [26] follows from the definition of Wasserstein distance and the second inequality in Eqn. [27] is the consequence of the assumptions described above.

Eqn. [28] may be recast as a group-sparsity norm:

$$\sum_{i=1}^{\hat{N}} \sum_{j=1}^{8} \sqrt{s_{[i,j]}^2 + s_{[i,j]}^2 \|\Delta r_{[i,j]}\|_2^2} = \sum_{i=1}^{\tilde{N}} \sqrt{s_i^2 + s_i^2 \|\Delta r_i\|_2^2} = \mathcal{R}(\mathcal{M})$$  Eqn. [29]

where it is assumed that $s_i = 0$ for grid index i that does not represent perturbed sources.
Confidence Quantification Via Convex Programming.

The objective function of Eqn. [23] may be rewritten in the form of:

$$E(\mathcal{M}) = \frac{1}{2} \mathbb{W}^2(\mathcal{M}, \mathcal{M}_0) + \epsilon \mathcal{L}(\mathcal{M}) + J_C(\mathcal{M})$$  Eqn. [30]

where $J_C$ represents the indicator function of the constraint set $\mathcal{C}$.

This analysis allows E($\mathcal{M}$) to be bound from above, as expressed by:

$$E(\mathcal{M}) \leq \frac{1}{2} \mathcal{R}(\mathcal{M}) + \epsilon \mathcal{L}(\mathcal{M}) + J_C(\mathcal{M})$$  Eqn. [31]

Based on this observation, the following regularized one-step dynamical process may be considered:

$$\mathcal{M}_1 = \underset{\mathcal{M} \in M(\mathbb{R}^2)}{\operatorname{argmin}} \left\{ \frac{1}{2} \mathcal{R}(\mathcal{M}) + \epsilon \mathcal{L}(\mathcal{M}) + \mathcal{J}_C(\mathcal{M}) \right\}$$  Eqn. [32]

Eqn. [32] is a convex program that may be efficiently solved using the optimization techniques developed above. The expression $\sum_{i=1}^{\hat{N}} (\sum_{j=1}^{8} \tilde{s}_{[i,j]} \delta(r - r_{[i,j]}))$ may be written, using the process described above, in the form:

$$\mathcal{M}_1 = \sum_{i=1}^{\hat{N}} (\sum_{j=1}^{8} \tilde{s}_{[i,j]} \delta(r - (\hat{r}_{\mathcal{G}_{[i,j]}} + r_{[i,j]})))$$  Eqn. [33]

By comparing the expressions of $\mathcal{M}_1$ and $\mathcal{M}_0$ it may be deduced, assuming $\hat{s}_{[i]} = \tilde{s}_{[i,j]}$, the displacement $r_{[i,j]} - T_{1[i,j]}$ in transporting $\mathcal{M}_0$ to $\mathcal{M}_1$ is simply given by $\Delta \tilde{r}_{[i,j]}$. Recall in calculating WIF as in Eqn. [18], $$\nabla \left( \frac{\delta \mathcal{L}}{\delta \mathcal{M}} (\mathcal{M})(r) \right)$$

may be replaced with $$v(r) \approx \frac{T_1(r) - r}{\epsilon}.$$

Consequently, an approximate WIF, i.e., localization confidence, may be computed for the $i^{th}$ molecule as follows:

$$WIF_i = c_i = \frac{\sum_{j=1}^{8} \hat{s}_{[i,j]} \|\Delta \hat{r}_{[i,j]}\|_2 \cdot \cos \zeta_{[i,j]}}{\sum_{j=1}^{8} \hat{s}_{[i,j]} \|\Delta \hat{r}_{[i,j]}\|_2}, \; i \in \{1, \ldots, N\}$$ Eqn. [34]

where $$\cos(\zeta_{[i,j]}) = \frac{\Delta \hat{r}_{[i,j]}^T (\hat{r}_{\mathcal{G}_{[i,j]}} - \hat{r}_{[i]})}{\|\Delta \hat{r}_{[i,j]}\|_2}$$

and $\hat{r}_{[i]}$ is the estimated position of $i^{th}$ molecule. $\partial_{[i,j]}$ is referred to herein as a transport angle because $\zeta_{[i,j]}$ represents the angle between the estimated source and the displacement from $\hat{r}_{\mathcal{G}_{[i,j]}}$.

Parameters of WIF

In computing WIF, a grid $\mathcal{G}$ is specified based on which a perturbation is defined as described previously. By construction of the perturbation, the distance between any two points on the grid $\mathcal{G}$, that is, $2\rho$, determines the uncertainty in the position of a molecule. $2\rho$ is defined to be (pixel size)/k for some integer k>0.

Another consideration is the choice of $\in$ in Eqn. [32]. Eqn. [32] is rewritten as:

$$\mathcal{M}_1 = \operatorname*{argmin}_{\mathcal{M} \in M(\mathbb{R}^2)} \{\nu \mathcal{R}(\mathcal{M}) + \mathcal{L}(\mathcal{M}) + \mathcal{J}_C(\mathcal{M})\}$$ Eqn. [35]

where $\nu = \frac{1}{2} \in$.

Figure 19:
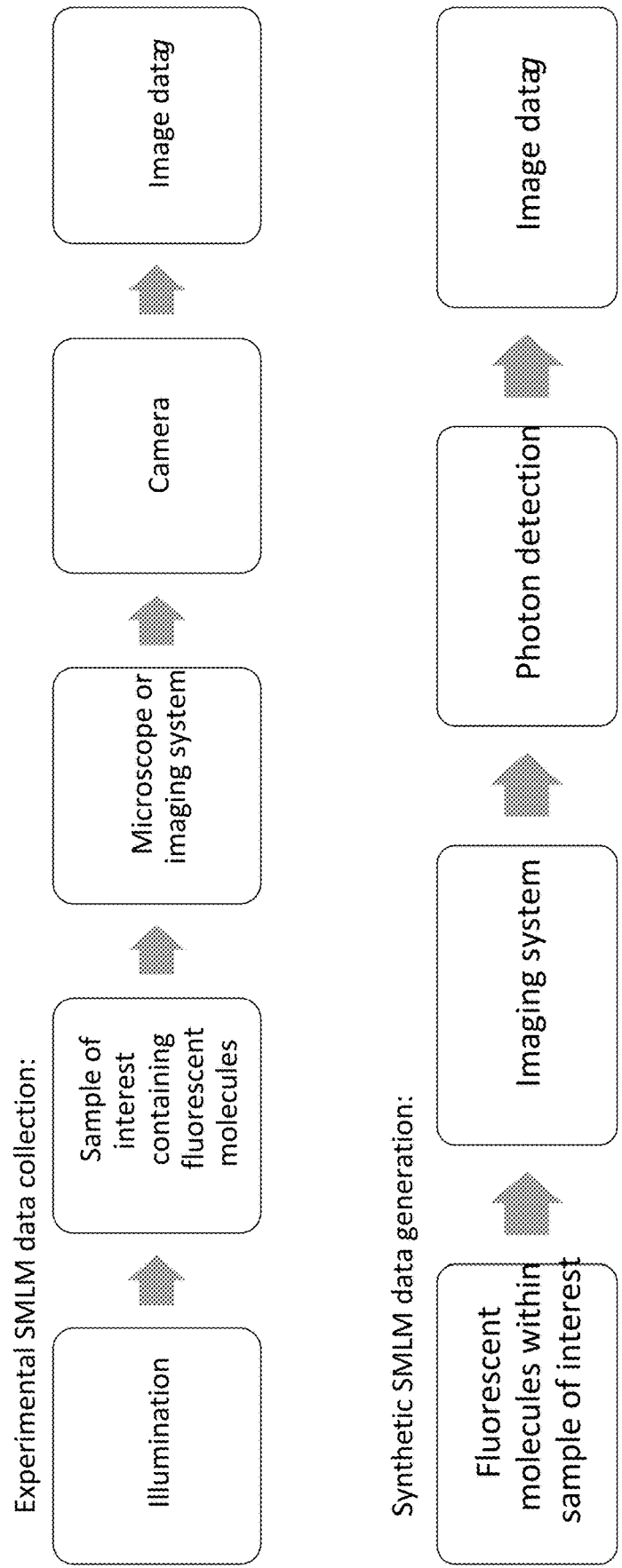
FIG. 19 is a block diagram schematically illustrating methods of generating SMLM image data by collecting experimental SMLM data (top) or generating synthetic SMLM data (bottom).
Figure 20:
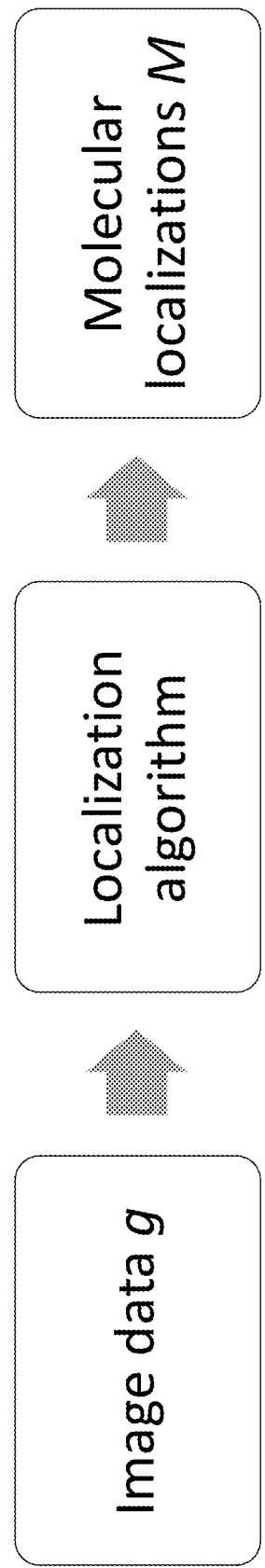
FIG. 20 is a block diagram schematically illustrating a method of generating localizations in SMLM imaging using a localization algorithm in accordance with one aspect of the disclosure.
Figure 21:
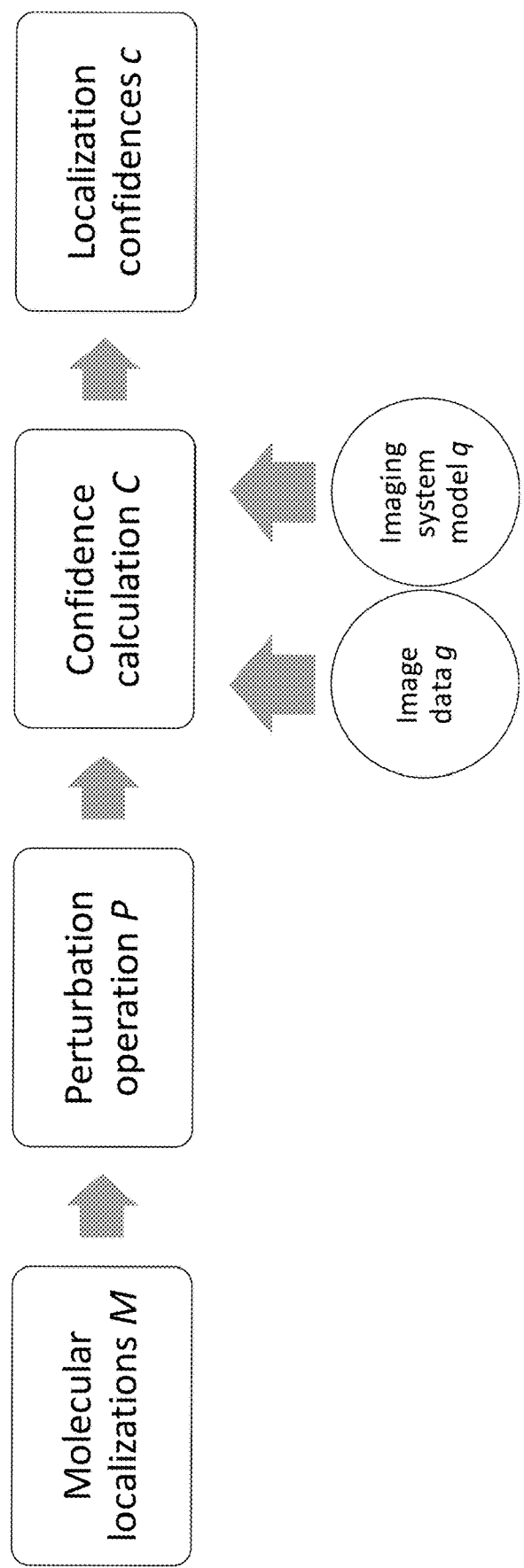
FIG. 21 is a block diagram schematically illustrating a method of computing localization confidence in accordance with one aspect of the disclosure.
Figure 22A:
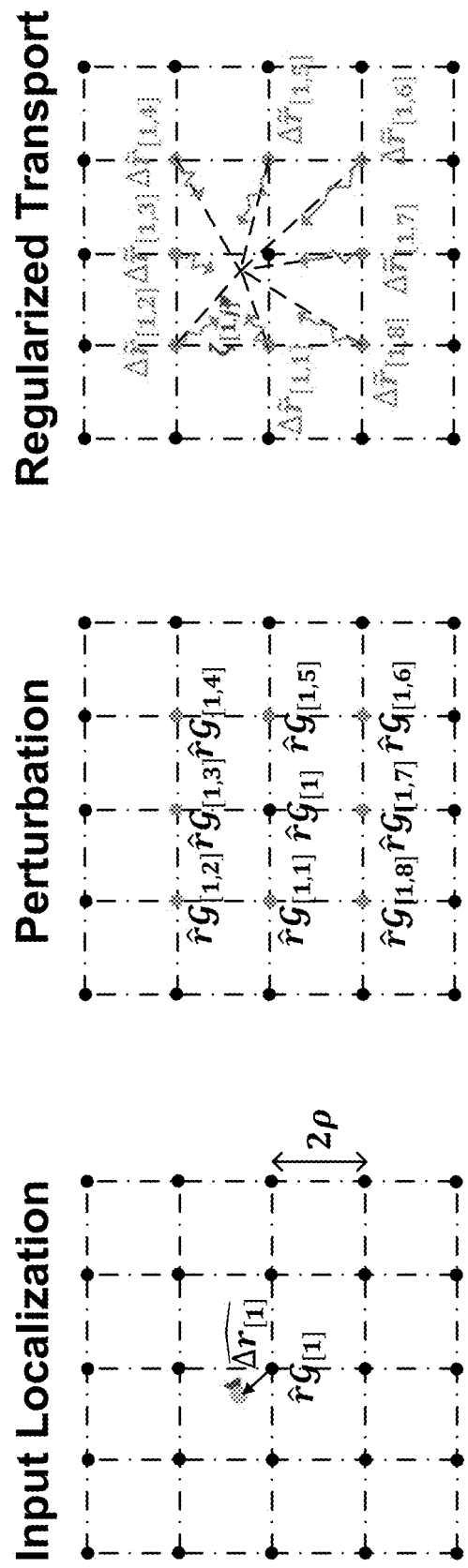
FIG. 22A contains a series of graphs illustrating a workflow for computing Wasserstein-induced flux (WIF) for a localization with a WIF of 0.9 in which an input localization (orange circle) located at is mapped to its closest grid point $\hat{r}\mathcal{G}_{[1]}$ and a position offset vector $\widetilde{\Delta r}_{[1]}$, i.e., $\hat{r}_{[1]} = \hat{r}\mathcal{G}_{[1]} + \widetilde{\Delta r}_{[1]}$ (left). Note that $2\rho$ indicates the distance between any two points on the grid. Perturbation consists of redistributing molecules' photons to its 8 closest grid points $\{\hat{r}\mathcal{G}_{[1,1]}, \ldots, \hat{r}\mathcal{G}_{[1,8]}\}$. Solving Eqn. [34] as described below amounts to finding a set of transport trajectories or displacements denoted by $\{\Delta \tilde{r}_{[1,1]}, \ldots, \Delta \tilde{r}_{[1,8]}\}$. The transport angle $\zeta_{[1,j]}$ is defined as the angle between the displacement and $\Delta \tilde{r}_{[1,j]}$ and $\{\hat{r}_{[1]} - \hat{r}\mathcal{G}_{[1,j]}\}$. WIF is computed according as denoted in Eqn. [34]. Note that since the estimated localization (orange circle) is close to the true position (red triangle), WIF is expected to be close to 1 indicating a high degree of confidence.
Figure 22B:
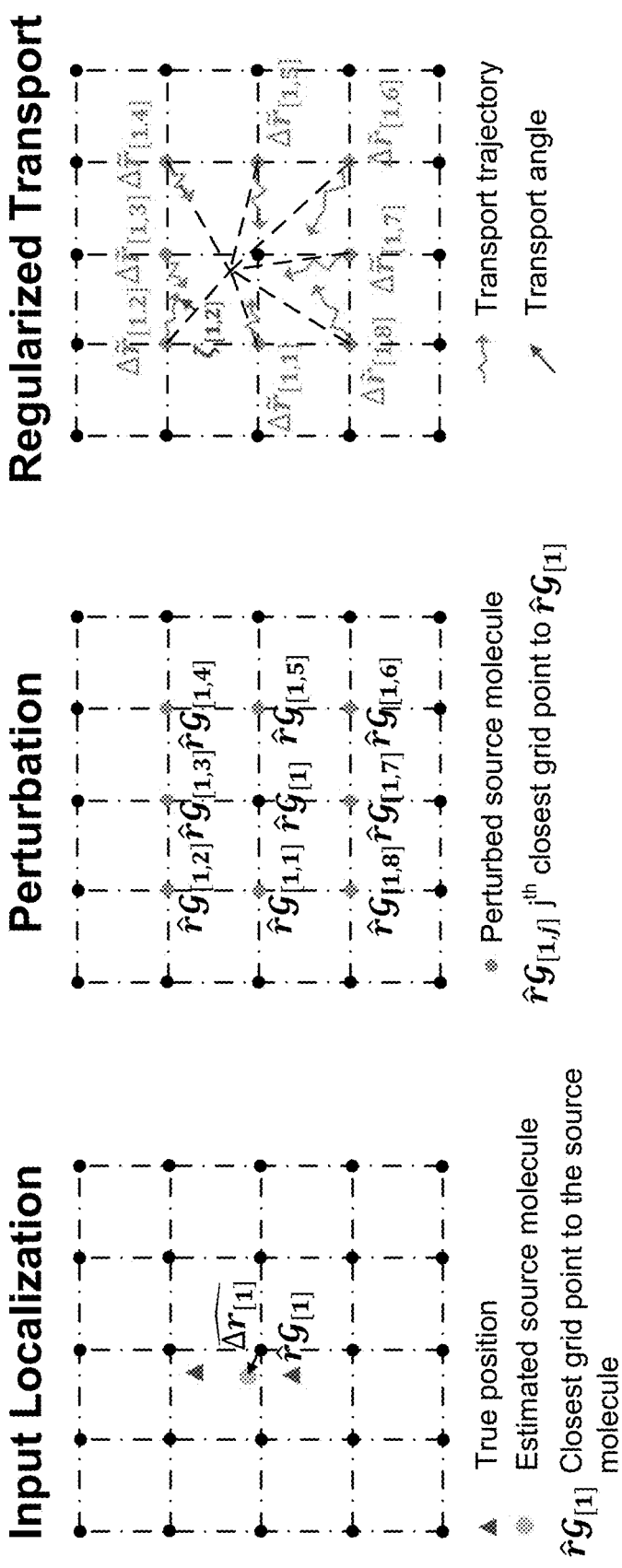
FIG. 22B contains a series of graphs illustrating a workflow for computing Wasserstein-induced flux (WIF) similar to the workflow illustrated for FIG. 22A, but for an inaccurate input localization (orange circle). Note that the computed WIF (0.5) is much smaller than 1, thereby signaling a high degree of uncertainty for this localization.

In essence, $\nu$ relates to the degree of uncertainty in $\tilde{\mathcal{M}}$, i.e., the perturbed localizations. For large $\nu$, there is little uncertainty in $\tilde{\mathcal{M}}$ and the solution to Eqn. [35] is equal to $\tilde{\mathcal{M}}$. If $\tilde{\mathcal{M}}$ is expected to be uncertain or equivalently that the unperturbed localizations $\hat{\mathcal{M}}$ are uncertain, a small value is selected for $\nu$. Therefore, some training data is used for choosing an appropriate value for $\nu$. In one aspect, isolated images of molecules generated using a simulator or obtained via control experiments as training data are used, as illustrated in FIG. 19. We list all the parameters we used for computing WIF in Table S1 below.

TABLE S1

Parameters used in computing WIF

Figure 2C:
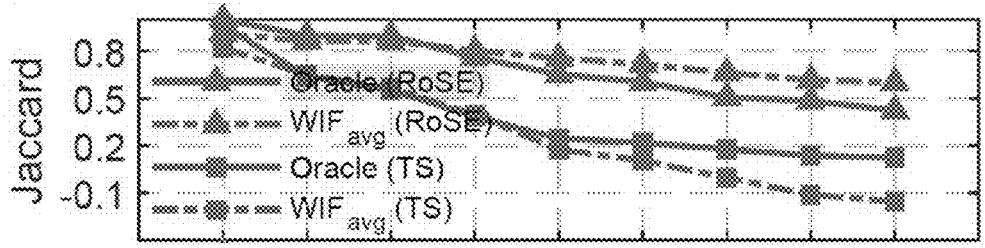
FIG. 2C is a graph summarizing the Jaccard indices calculated from the localizations produced using RoSE (solid, red) and TS (solid, green) at various blinking densities; dashed lines represent $WIF_{avg}$ calculated based on the RoSE (red) and TS (green) localizations. For each blinking density, 200 independent realizations were used.
Figure 2D:
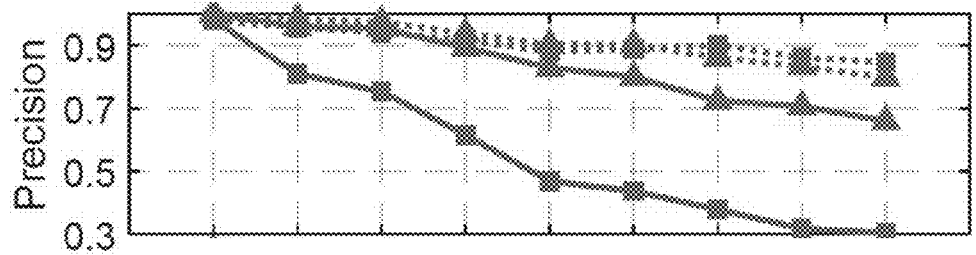
FIG. 2D is graph summarizing the precision calculated for all localizations (solid) and localizations with confidence greater than 0.5 (dotted) using RoSE (red) and TS (green), respectively.
Figure 2E:
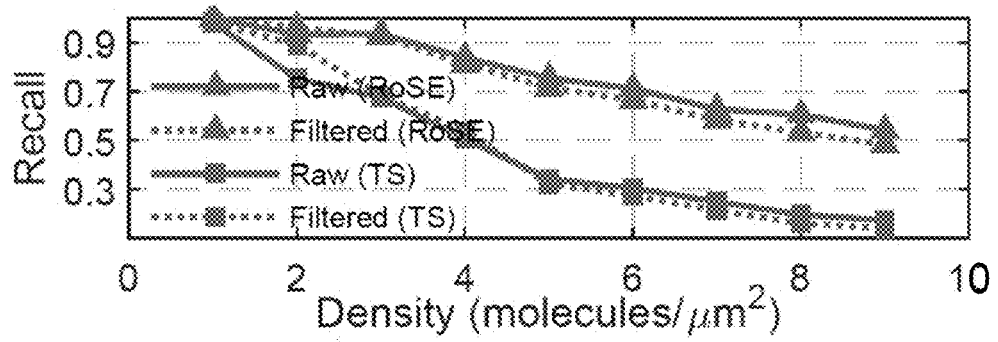
FIG. 2E is a graph summarizing the recall calculated for all localizations (solid) and localizations with confidence greater than 0.5 (dotted) using RoSE (red) and TS (green), respectively.
Figure 3C:
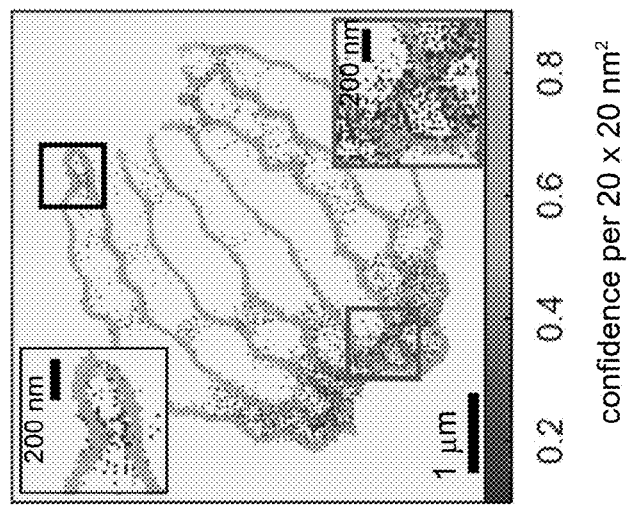
FIG. 3C is an image of a confidence map (brighter colors indicate higher confidence) obtained by averaging localization confidences in each pixel.

| Dataset | 2 ρ | ν |
|---|---|---|
| FIGS. 1C, 1D, 1E, 1F, 2C, 2D, 2E, 5G, 5H, 5I, 6C, 6D, 8 9A, 9C, 10A, 10B, 11A, 11B, 12A, 14A, 14B | 58.5/2 nm | 0.1 |
| FIG. 3C | 100/2 nm | 0.1 |
| FIGS. 4A, 13A, 13B, 13C | 160/3 nm | 0.1 |

PSF Model in Computing WIF.

In order to efficiently solve the optimization problem in Eqn. [35], a first-order approximation of the exact PSF is used. For any $\mathcal{M} \in M(\mathbb{R}^2)$:

$$\mathcal{M} = \Sigma_{i=1}^{N} s_{[i]} \delta(r - (r_{\mathcal{G}_{[i]}} + \Delta r_{[i]}))$$ Eqn. [36]

where $\|\Delta r_{[i]}\|_2 \leq \rho$.

If the exact PSF is denoted by $q_c$, the resulting intensity $\mu_j$, that is, the expected number of photons detected on camera, for each pixel j is written as:

$$\mu_j = \Sigma_{i=1}^{N} \{s_i q_{c,j}(r_{\mathcal{G}_{[i]}} + \Delta r_{[i]}) + b_j\} =$$

$$\Sigma_{i=1}^{N} \{s_i q_{c,j}(r_{\mathcal{G}_{[i]}}) = \Delta r_{[i]} q'_{c,j}(r_{\mathcal{G}_{[i]}}) + O(\Delta r_{[i]}^2) + b_j\},$$
$$j \in \{1, \ldots, m\}$$ Eqn. [37]

where $q'_{c,j}(r_{\mathcal{G}_{[i]}})$ denotes the derivative of $q_{c,j}$ with the respect to position evaluated at $r_{\mathcal{G}_{[i]}}$, and $O(\Delta r_{[i]}^2)$ represents the residual error in the Taylor expansion.

The residual term in Eqn. [37] is dropped and only terms up to the first-order terms are considered:

$$\mu_j = \Sigma_{i=1}^{N} \{s_i q_{c,j}(r_{\mathcal{G}_{[i]}}) + \Delta r_{[i]} q'_{c,j}(r_{\mathcal{G}_{[i]}}) + b_j\}, j \in \{1, \ldots, m\}$$ Eqn. [38]

Computing Systems and Devices

Figure 15:
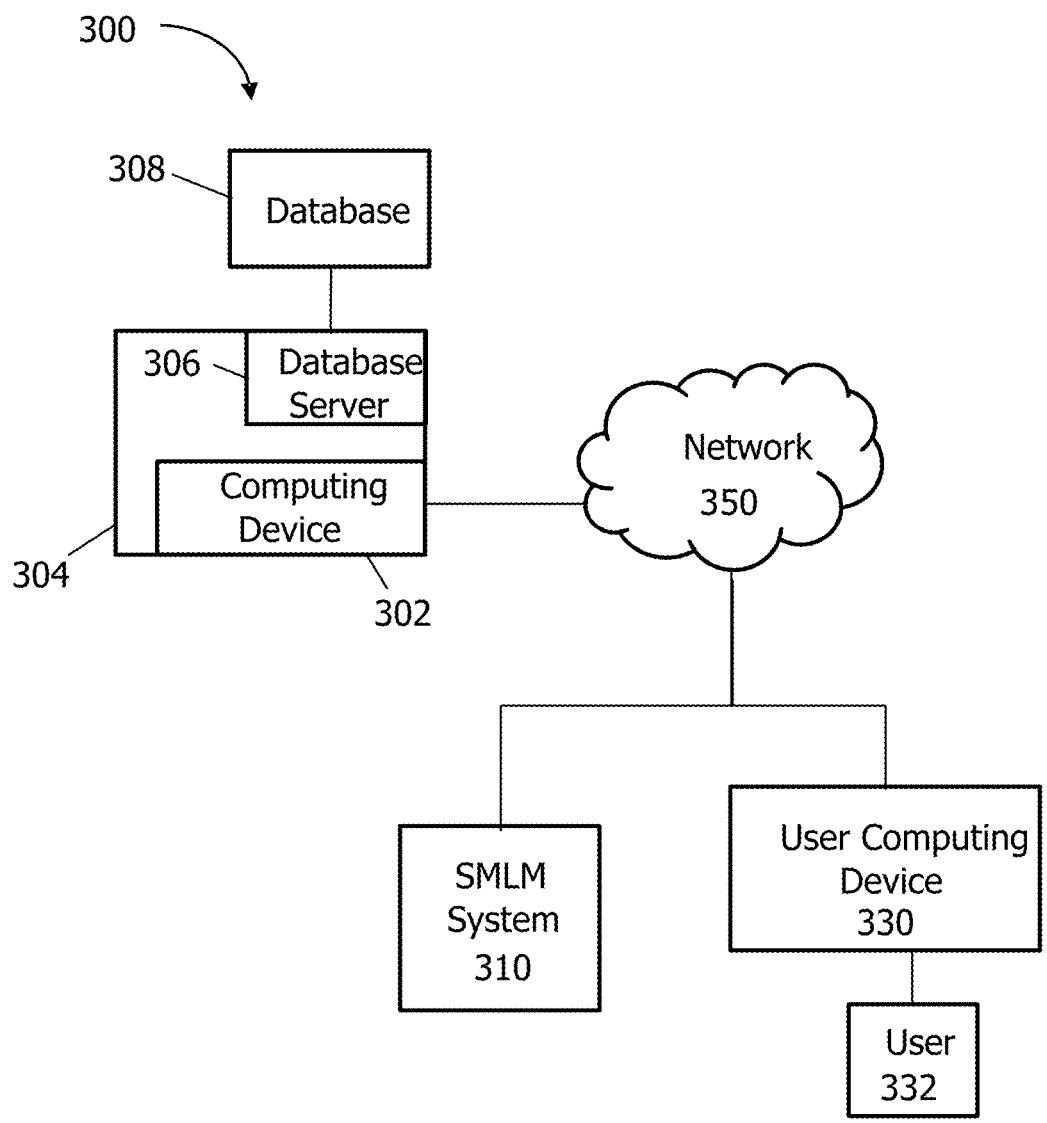
FIG. 15 is a block diagram schematically illustrating a system in accordance with one aspect of the disclosure.

FIG. 15 depicts a simplified block diagram of a computing device 300 for implementing the methods described herein. As illustrated in FIG. 15, the computing device 300 may be configured to implement at least a portion of the tasks associated with disclosed method using the system 310 including, but not limited to: operating the SMLM system 310 to obtain single-molecule localization microscopy (SMLM) images and analyzing the SMLM images using the methods described herein to assess the confidence of localizations within the single-molecule localization microscopy (SMLM) images. The computer system 300 may include a computing device 302. In one aspect, the computing device 302 is part of a server system 304, which also includes a database server 306. The computing device 302 is in communication with a database 308 through the database server 306. The computing device 302 is communicably coupled to the SMLM system 310 and a user computing device 330 through a network 350. The network 350 may be any network that allows local area or wide area communication between the devices. For example, the network 350 may allow communicative coupling to the Internet through at least one of many interfaces including, but not limited to, at least one of a network, such as the Internet, a local area network (LAN), a wide area network (WAN), an integrated services digital network (ISDN), a dial-up-connection, a digital subscriber line (DSL), a cellular phone connection, and a cable modem. The user computing device 330 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Figure 16:
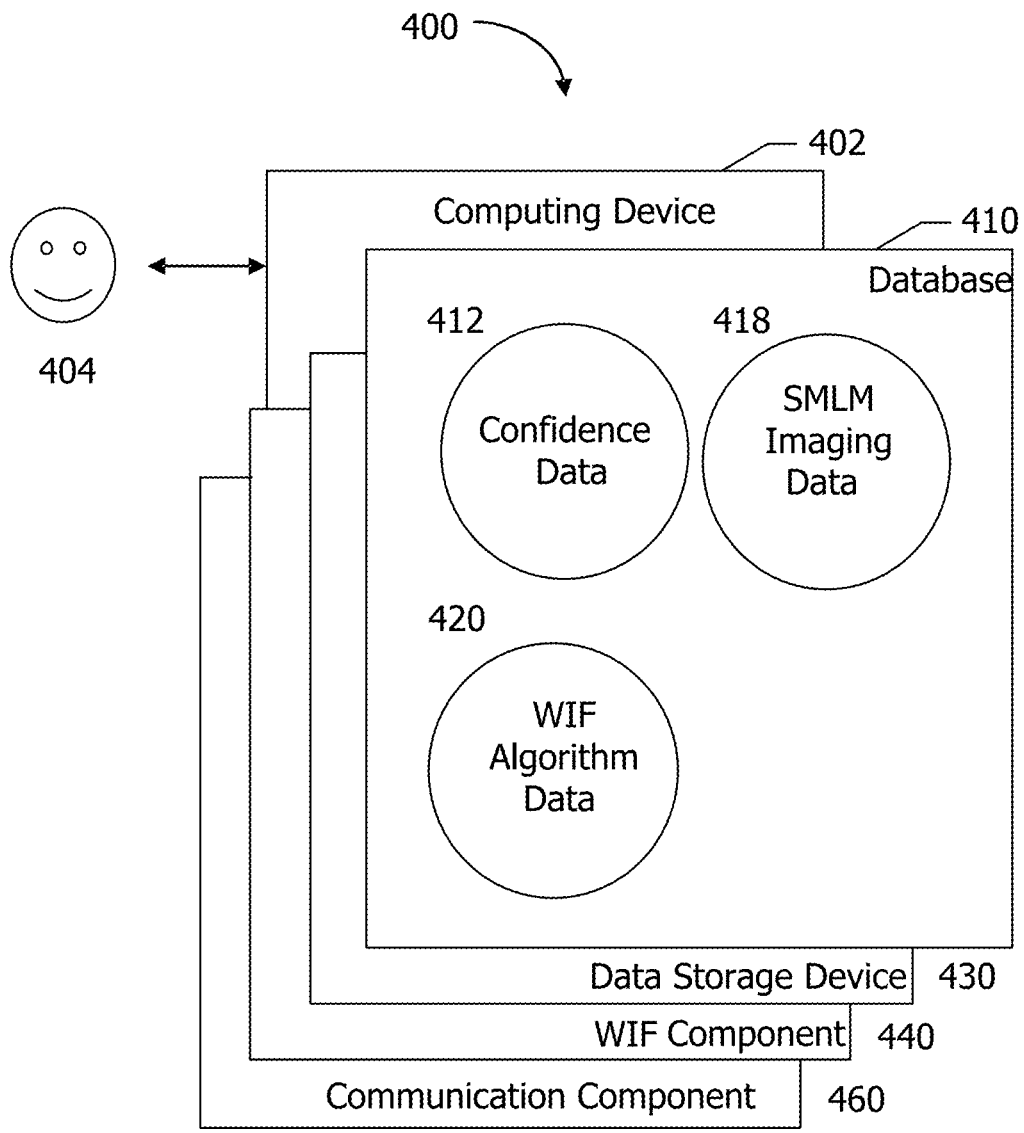
FIG. 16 is a block diagram schematically illustrating a computing device in accordance with one aspect of the disclosure.

In other aspects, the computing device 302 is configured to perform a plurality of tasks associated with assessing confidence in localizations in SMLM images using a Wasserstein-induced flux (WIF) method as described herein. FIG. 16 depicts a component configuration 400 of computing device 402, which includes database 410 along with other related computing components. In some aspects, computing device 402 is similar to computing device 302 (shown in FIG. 15). A user 404 may access components of computing device 402. In some aspects, database 410 is similar to database 308 (shown in FIG. 15).

In one aspect, database 410 includes SMLM imaging data 418, WIF algorithm data 420, and confidence data 412 defining the confidence of localizations within the SMLM imaging data. Non-limiting examples of suitable algorithm data 420 includes any values of parameters defining the WIF-based method of confidence assessment, such as any of the parameters from the equations described above. In one aspect, the confidence data 412 may be used to filter the SMLM imaging data to remove localizations with a confidence falling below a threshold in order to enhance SMLM image quality, as described herein. In one aspect, the confidence threshold is 0.5. In various other aspects, the confidence threshold is 0.9, 0.8, 0.7, 0.6, 0.5, 0.4, 0.3, 0.2, and 0.1.

Computing device 402 also includes a number of components which perform specific tasks. In the example aspect, computing device 402 includes data storage device 430, WIF component 440, and communication component 460. Data storage device 430 is configured to store data received or generated by computing device 402, such as any of the data stored in database 410 or any outputs of processes implemented by any component of computing device 402. WIF component 440 is configured to produce a plurality of confidences for the plurality of localizations within the SMLM image using the method described herein in various aspects.

Communication component 460 is configured to enable communications between computing device 402 and other devices (e.g. user computing device 330 and SMLM system 310, shown in FIG. 15) over a network, such as network 350 (shown in FIG. 15), or a plurality of network connections using predefined network protocols such as TCP/IP (Transmission Control Protocol/Internet Protocol).

Figure 17:
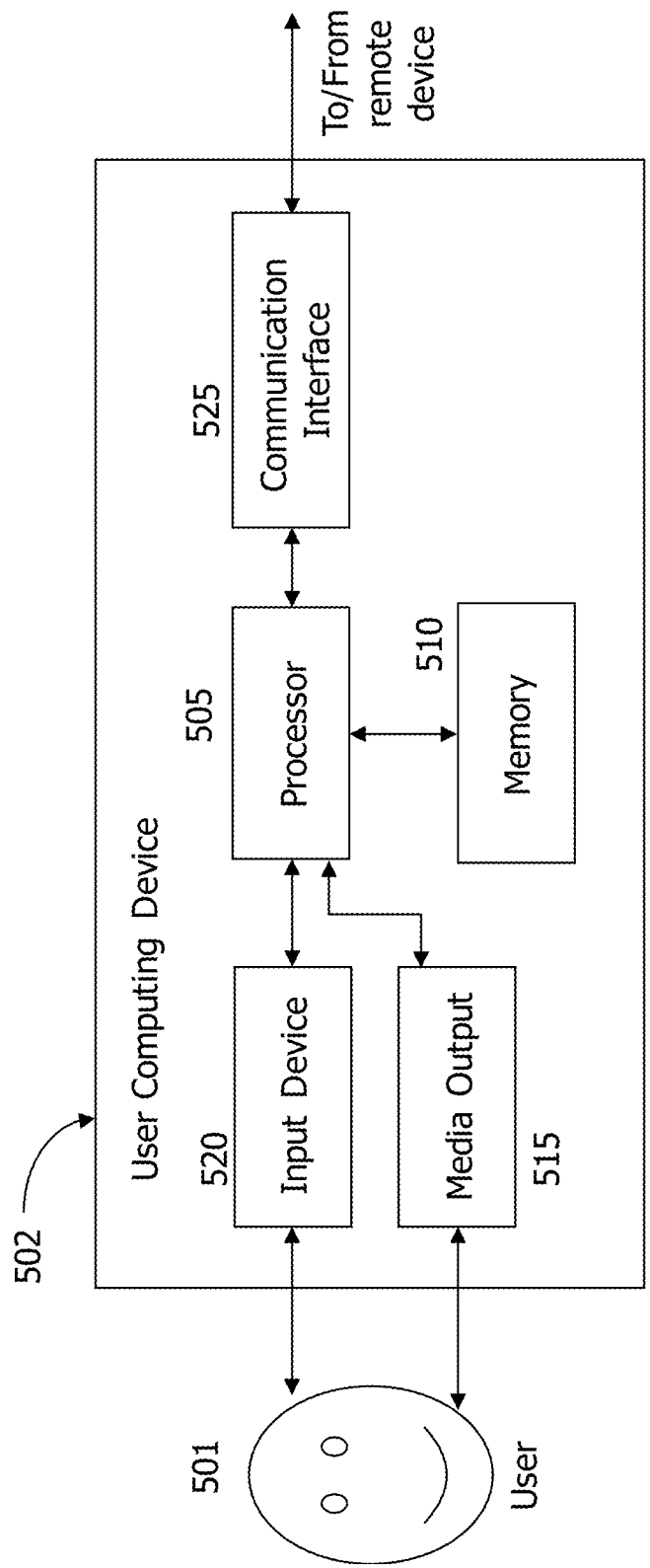
FIG. 17 is a block diagram schematically illustrating a remote or user computing device in accordance with one aspect of the disclosure.

FIG. 17 depicts a configuration of a remote or user computing device 502, such as user computing device 330 (shown in FIG. 15). Computing device 502 may include a processor 505 for executing instructions. In some aspects, executable instructions may be stored in a memory area 510. Processor 505 may include one or more processing units (e.g., in a multi-core configuration). Memory area 510 may be any device allowing information such as executable instructions and/or other data to be stored and retrieved. Memory area 510 may include one or more computer-readable media.

Computing device 502 may also include at least one media output component 515 for presenting information to a user 501. Media output component 515 may be any component capable of conveying information to user 501. In some aspects, media output component 515 may include an output adapter, such as a video adapter and/or an audio adapter. An output adapter may be operatively coupled to processor 505 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some aspects, media output component 515 may be configured to present an interactive user interface (e.g., a web browser or client application) to user 501.

In some aspects, computing device 502 may include an input device 520 for receiving input from user 501. Input device 520 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 515 and input device 520.

Computing device 502 may also include a communication interface 525, which may be communicatively coupleable to a remote device. Communication interface 525 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 510 are, for example, computer-readable instructions for providing a user interface to user 501 via media output component 515 and, optionally, receiving and processing input from input device 520. A user interface may include, among other possibilities, a web browser and client application. Web browsers enable users 501 to display and interact with media and other information typically embedded on a web page or a website from a web server. A client application allows users 501 to interact with a server application associated with, for example, a vendor or business.

Figure 18:
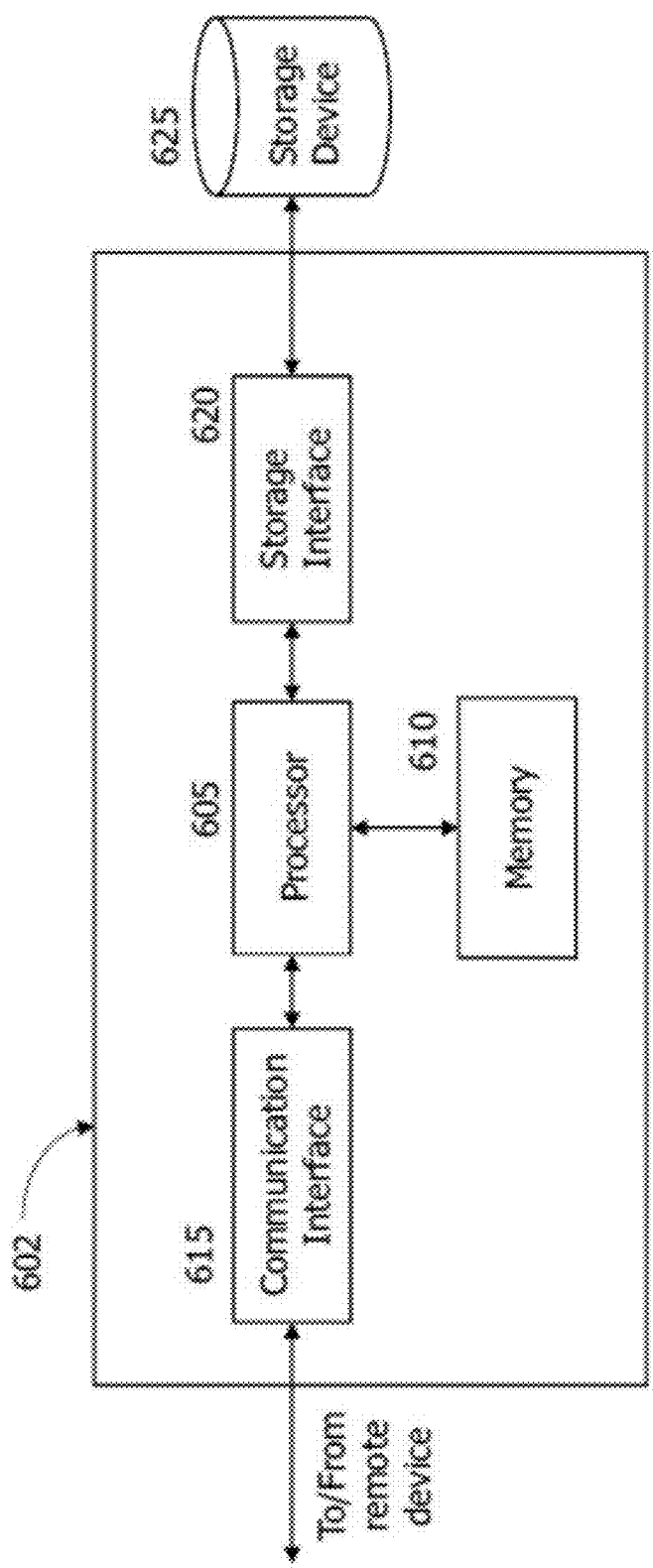
FIG. 18 is a block diagram schematically illustrating a server system in accordance with one aspect of the disclosure.

FIG. 18 illustrates an example configuration of a server system 602. Server system 602 may include, but is not limited to, database server 306 and computing device 302 (both shown in FIG. 15). In some aspects, server system 602 is similar to server system 304 (shown in FIG. 15). Server system 602 may include a processor 605 for executing instructions. Instructions may be stored in a memory area 625, for example. Processor 605 may include one or more processing units (e.g., in a multi-core configuration).

Processor 605 may be operatively coupled to a communication interface 615 such that server system 602 may be capable of communicating with a remote device such as user computing device 330 (shown in FIG. 15) or another server system 602. For example, communication interface 615 may receive requests from user computing device 330 via a network 350 (shown in FIG. 15).

Processor 605 may also be operatively coupled to a storage device 625. Storage device 625 may be any computer-operated hardware suitable for storing and/or retrieving data. In some aspects, storage device 625 may be integrated in server system 602. For example, server system 602 may include one or more hard disk drives as storage device 625. In other aspects, storage device 625 may be external to server system 602 and may be accessed by a plurality of server systems 602. For example, storage device 625 may include multiple storage units such as hard disks or solid state disks in a redundant array of inexpensive disks (RAID) configuration. Storage device 625 may include a storage area network (SAN) and/or a network attached storage (NAS) system.

In some aspects, processor 605 may be operatively coupled to storage device 625 via a storage interface 620. Storage interface 620 may be any component capable of providing processor 605 with access to storage device 625. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 625.

Memory areas 510 (shown in FIG. 17) and 610 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

The computer systems and computer-implemented methods discussed herein may include additional, less, or alternate actions and/or functionalities, including those discussed elsewhere herein. The computer systems may include or be implemented via computer-executable instructions stored on non-transitory computer-readable media. The methods may be implemented via one or more local or remote processors, transceivers, servers, and/or sensors (such as processors, transceivers, servers, and/or sensors mounted on vehicle or mobile devices, or associated with smart infrastructure or remote servers), and/or via computer executable instructions stored on non-transitory computer-readable media or medium.

In some aspects, a computing device is configured to implement machine learning, such that the computing device "learns" to analyze, organize, and/or process data without being explicitly programmed. Machine learning may be implemented through machine learning (ML) methods and algorithms. In one aspect, a machine learning (ML) module is configured to implement ML methods and algorithms. In some aspects, ML methods and algorithms are applied to data inputs and generate machine learning (ML) outputs. Data inputs may include but are not limited to: images or frames of a video, object characteristics, and object categorizations. Data inputs may further include: sensor data, image data, video data, telematics data, authentication data, authorization data, security data, mobile device data, geolocation information, transaction data, personal identification data, financial data, usage data, weather pattern data, "big data" sets, and/or user preference data. ML outputs may include but are not limited to: a tracked shape output, categorization of an object, categorization of a type of motion, a diagnosis based on motion of an object, motion analysis of an object, and trained model parameters ML outputs may further include: speech recognition, image or video recognition, medical diagnoses, statistical or financial models, autonomous vehicle decision-making models, robotics behavior modeling, fraud detection analysis, user recommendations and personalization, game AI, skill acquisition, targeted marketing, big data visualization, weather forecasting, and/or information extracted about a computer device, a user, a home, a vehicle, or a party of a transaction. In some aspects, data inputs may include certain ML outputs.

In some aspects, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, dimensionality reduction, and support vector machines. In various aspects, the implemented ML methods and algorithms are directed toward at least one of a plurality of categorizations of machine learning, such as supervised learning, unsupervised learning, and reinforcement learning.

In one aspect, ML methods and algorithms are directed toward supervised learning, which involves identifying patterns in existing data to make predictions about subsequently received data. Specifically, ML methods and algorithms directed toward supervised learning are "trained" through training data, which includes example inputs and associated example outputs. Based on the training data, the ML methods and algorithms may generate a predictive function which maps outputs to inputs and utilize the predictive function to generate ML outputs based on data inputs. The example inputs and example outputs of the training data may include any of the data inputs or ML outputs described above.

In another aspect, ML methods and algorithms are directed toward unsupervised learning, which involves finding meaningful relationships in unorganized data. Unlike supervised learning, unsupervised learning does not involve user-initiated training based on example inputs with associated outputs. Rather, in unsupervised learning, unlabeled data, which may be any combination of data inputs and/or ML outputs as described above, is organized according to an algorithm-determined relationship.

In yet another aspect, ML methods and algorithms are directed toward reinforcement learning, which involves optimizing outputs based on feedback from a reward signal. Specifically ML methods and algorithms directed toward reinforcement learning may receive a user-defined reward signal definition, receive a data input, utilize a decision-making model to generate a ML output based on the data input, receive a reward signal based on the reward signal definition and the ML output, and alter the decision-making model so as to receive a stronger reward signal for subsequently generated ML outputs. The reward signal definition may be based on any of the data inputs or ML outputs described above. In one aspect, a ML module implements reinforcement learning in a user recommendation application. The ML module may utilize a decision-making model to generate a ranked list of options based on user information received from the user and may further receive selection data based on a user selection of one of the ranked options. A reward signal may be generated based on comparing the selection data to the ranking of the selected option. The ML module may update the decision-making model such that subsequently generated rankings more accurately predict a user selection.

As will be appreciated based upon the foregoing specification, the above-described aspects of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed aspects of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one aspect, a computer program is provided, and the program is embodied on a computer readable medium. In one aspect, the system is executed on a single computer system, without requiring a connection to a sever computer. In a further aspect, the system is being run in a Windows® environment (Windows is a registered trademark of Microsoft Corporation, Redmond, Wash.). In yet another aspect, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some aspects, the system includes multiple components distributed among a plurality of computing devices. One or more components may be in the form of computer-executable instructions embodied in a computer-readable medium. The systems and processes are not limited to the specific aspects described herein. In addition, components of each system and each process can be practiced independent and separate from other components and processes described herein. Each component and process can also be used in combination with other assembly packages and processes. The present aspects may enhance the functionality and functioning of computers and/or computer systems.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein. The recitation of discrete values is understood to include ranges between each value.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

Any publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

EXAMPLES

The following examples illustrate various aspects of the disclosure.

Example 1: Localization Confidence of an Isolated Molecule

To demonstrate the utility of the disclosed confidence metric, images of fluorescent molecules generated using a vectorial image formation model were analyzed. The images included various hidden physical parameters such as defocus and rotational mobility.

Using the vectorial image-formation model, a molecule is modelled as a dipole rotating uniformly within a cone with a half angle $\alpha$. A rotationally fixed dipole corresponds to $\alpha=0$, while $\alpha=90$ represents an isotropic molecule. A wavelength of 637 nm and a NA=1.4 was used for the microscope model, a pixel size of 58.5×58.5 nm$^2$ was used for the CCD camera model, and a uniform background was assumed for all images produced using the vectorial image-formation model.

Figure 8:
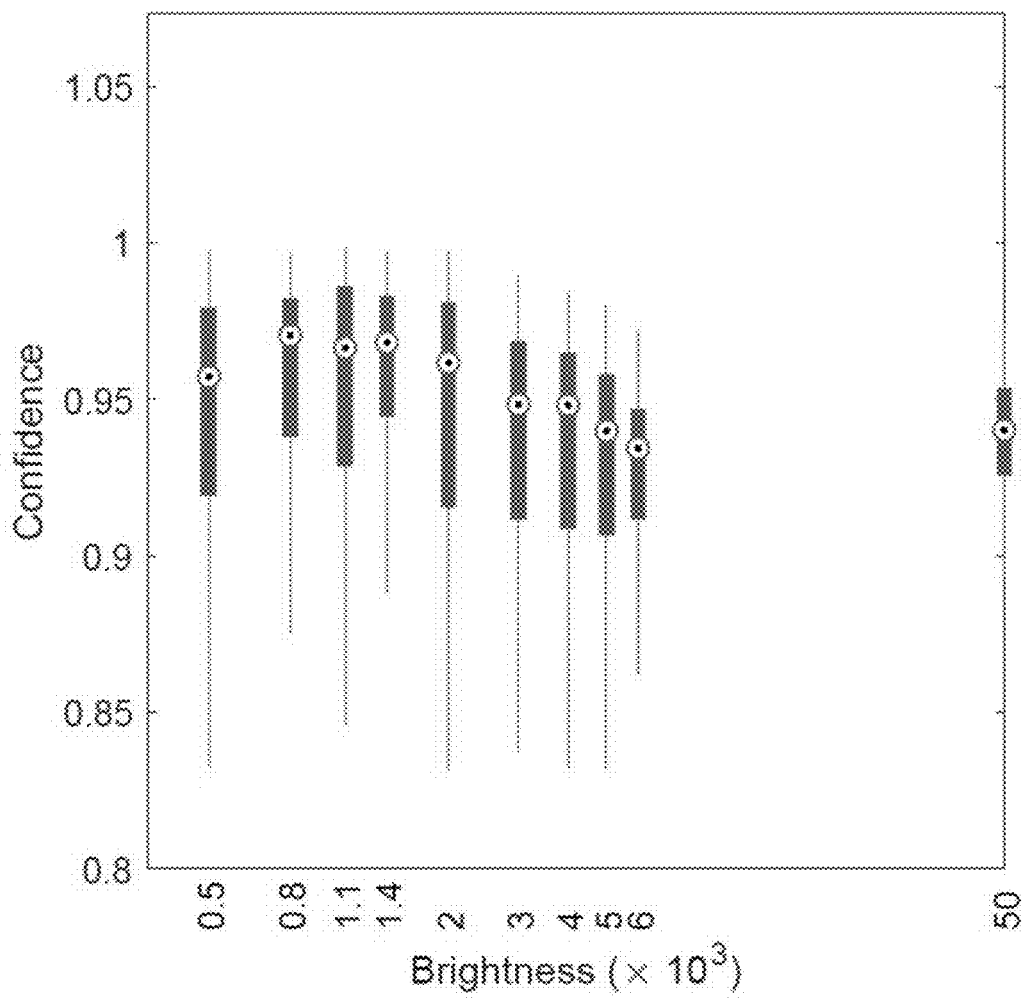
FIG. 8 is a graph summarizing localization confidence of a molecule with various brightnesses; for each brightness, 300 independent images of an isotropic molecule were analyzed and background was set to 20 photons per pixel. Black circles represent the medians of confidence distributions, while bottom and top edges of the boxes (colored in magenta) indicate 25th and 75th percentiles, respectively.

These analyses characterized not only how well WIF measures mismatches introduced by these parameters, but also its limitations due to statistical shot noise, especially for low photon counts. As a baseline, the PSF model was fixed in the confidence analysis to that of an isotropic molecule with zero defocus. To determine the confidence metric's robustness to shot noise, 100 noisy, independent realizations of an isotropic emitter for a wide range of detected photons were evaluated. The confidences were observed to be mostly close to 1 for all photon counts, taking values in [0.95, 1] (FIG. 8). It was also recognized that the first-order approximation in the PSF model introduced a negligible reduction in estimated confidences for large photon counts (FIG. 8).

Figure 9A:
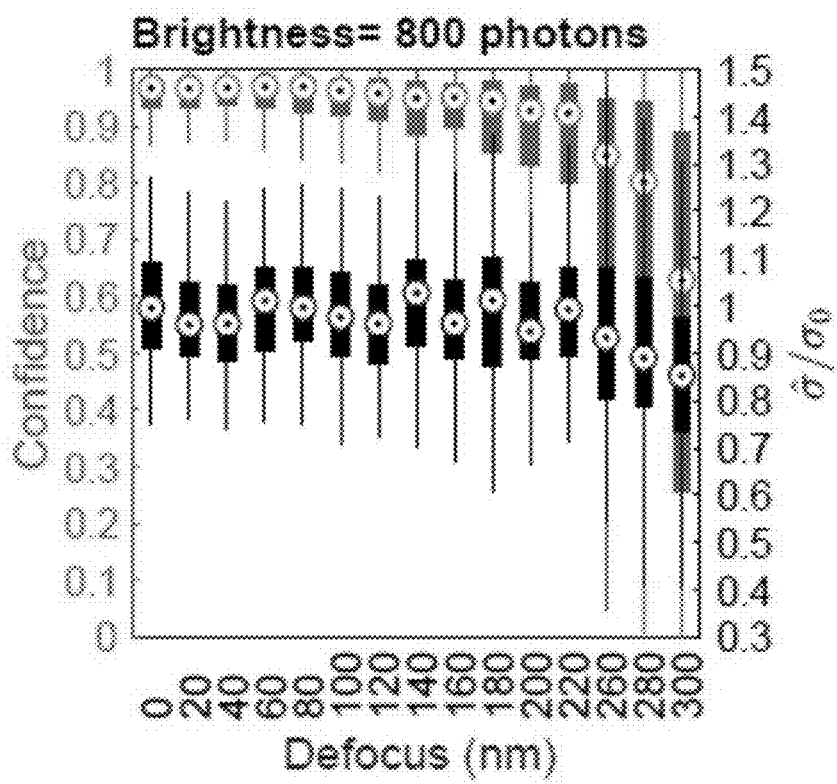
FIG. 9A is a graph summarizing localization confidence of a molecule with various defocus mismatches; for each defocus value, 300 independent images of an isotropic molecule with a brightness of 800 photons were analyzed. Background was set to 20 photons per pixel. The PSF model in the confidence analysis algorithm was set to the PSF with defocus zero. Black circles represent the medians of confidence and normalized PSF width ($\hat{\sigma}/\sigma_0$) distributions, while bottom and top edges of the boxes (colored in magenta and black) indicate 25th and 75th percentiles, respectively.
Figure 9B:
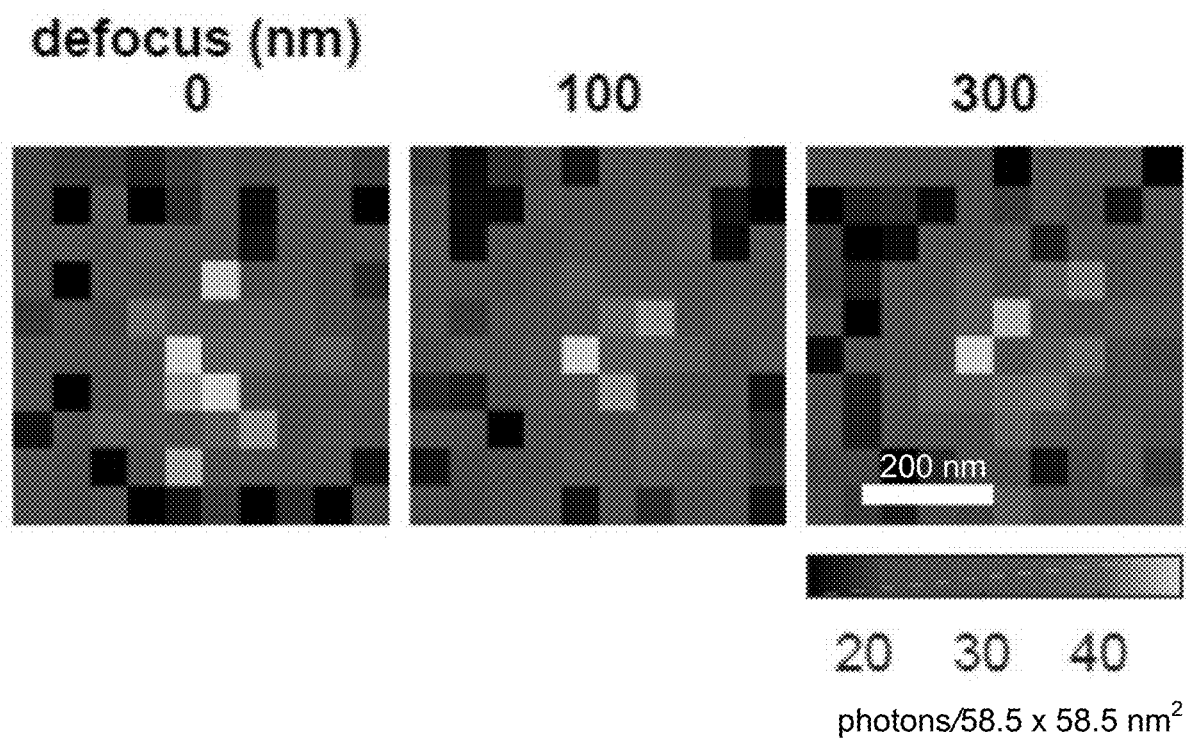
FIG. 9B contains examples of images analyzed to produce the graph of FIG. 9A for a defocus of 0 nm (left), 100 nm (middle), and 200 nm (right).

To quantify how hidden variables that are not accounted for within the model affect the confidences, additional analysis was performed. For a dim molecule (800 photons) at modest defocus values ($z \in [0, 200$ nm$]$), it was observed that the confidences mostly remained above 0.9 (FIGS. 9A and 9B). As defocus increased beyond 200 nm, approximately 50% of localizations exhibited confidence lower than 0.9. In particular, for z=300 nm, the median confidence decreased to 0.62, a reduction of approximately 40% (FIG. 9A). The confidence metric was remarkably more sensitive to defocus compared to estimates of PSF width normalized with respect to the PSF width at focus, which fluctuated mostly within 10% of their nominal values. For z=300 nm, the median width was reduced by only 13% from its nominal value (FIG. 9A).

Figure 9C:
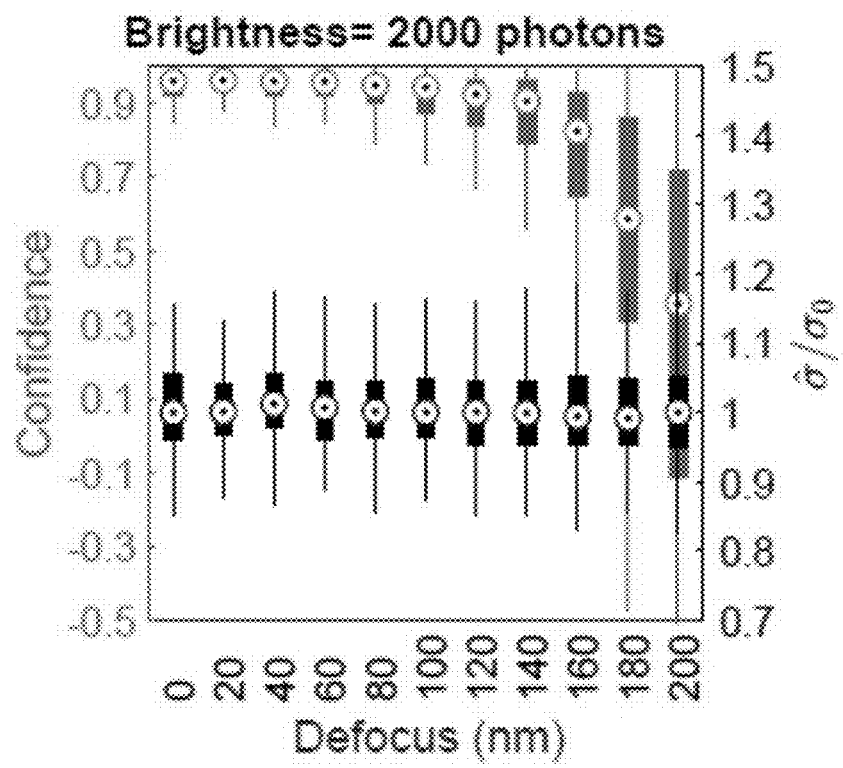
FIG. 9C is a graph summarizing localization confidence of a molecule with various defocus mismatches similar to the graph of FIG. 9A, in which 300 independent images of an isotropic molecule with a brightness of 2000 photons were analyzed.
Figure 9D:
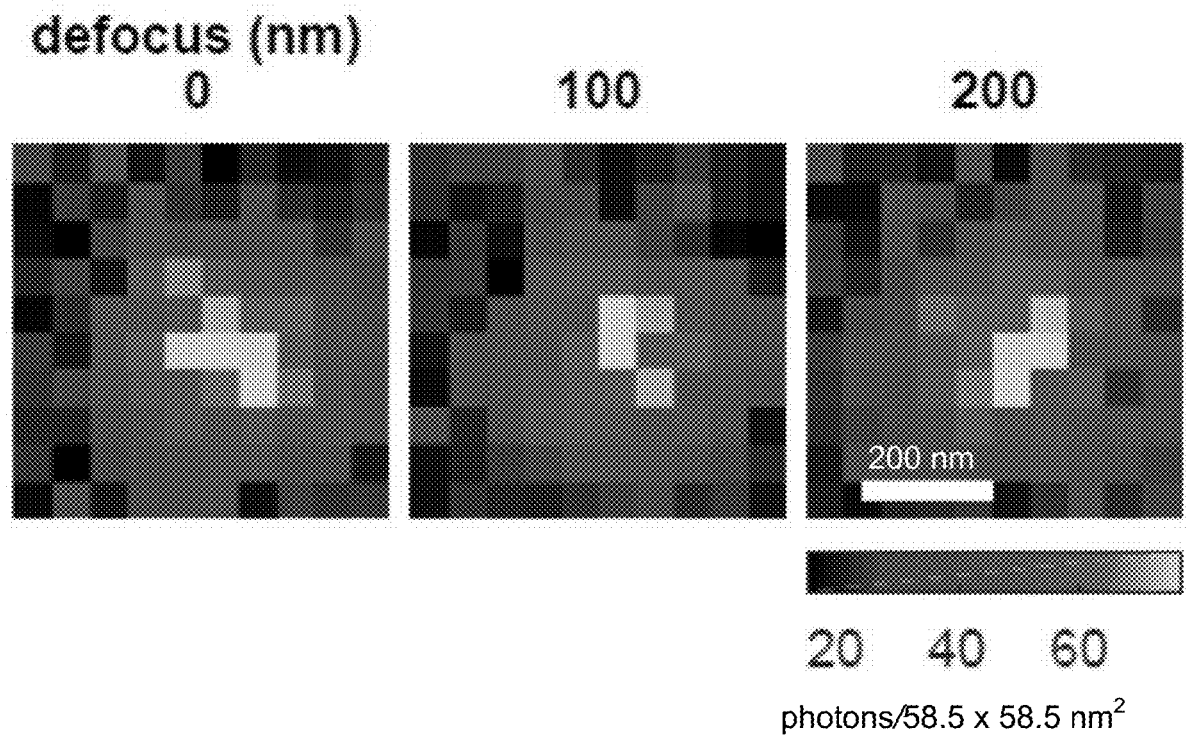
FIG. 9D contains examples of images analyzed to produce the graph of FIG. 9C for a defocus of 0 nm (left), 100 nm (middle), and 200 nm (right).

To explore how shot noise affects WIF and width estimates, a bright molecule (2000 photons) was analyzed while keeping the molecular parameters untouched (FIG. 9D). Interestingly, as soon as the defocus increased beyond 140 nm, the confidences sharply dropped below 0.9 such that at z=200 nm the median confidence approached 0.3. In contrast, normalized width estimates remained mostly within 5% of their nominal values with their medians consistently close to 1 (FIG. 9C). Defocus-induced model mismatches were effectively detected by WIF for brighter molecules with sufficient signal-to-noise ratios.

Figures 10A, 10B:
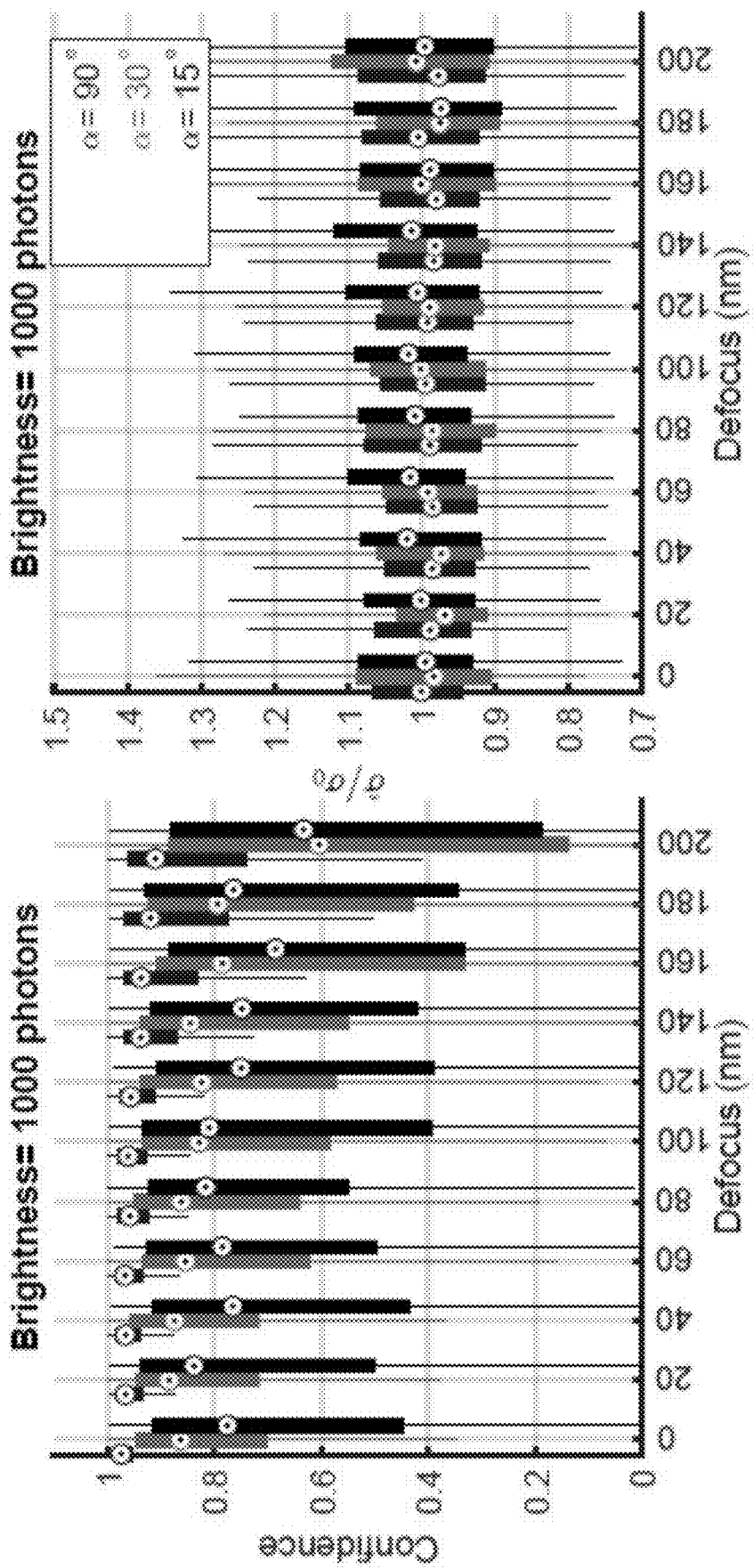
FIG. 10A is a graph summarizing localization confidence of a molecule with various defocus and dipole-induced mismatches. For each defocus value, 300 independent images of a dipole with a brightness of 1000 photons, an out-of-plane angle of 45°, and an in-plane angle of 0° rotating uniformly within a cone with half angles of 90° (blue), 30° (magenta), and 15° (black) were analyzed. Black circles represent the medians of confidence distributions, while bottom and top edges of the boxes (colored in blue ($\alpha=$) 90°, magenta ($\alpha=30°$), and black ($\alpha=15°$) indicate 25th and 75th percentiles, respectively.
FIG. 10B is a graph similar to the graph of FIG. 10A, for normalized PSF width estimates ($\hat{\sigma}/\sigma_0$).
Figure 10C:
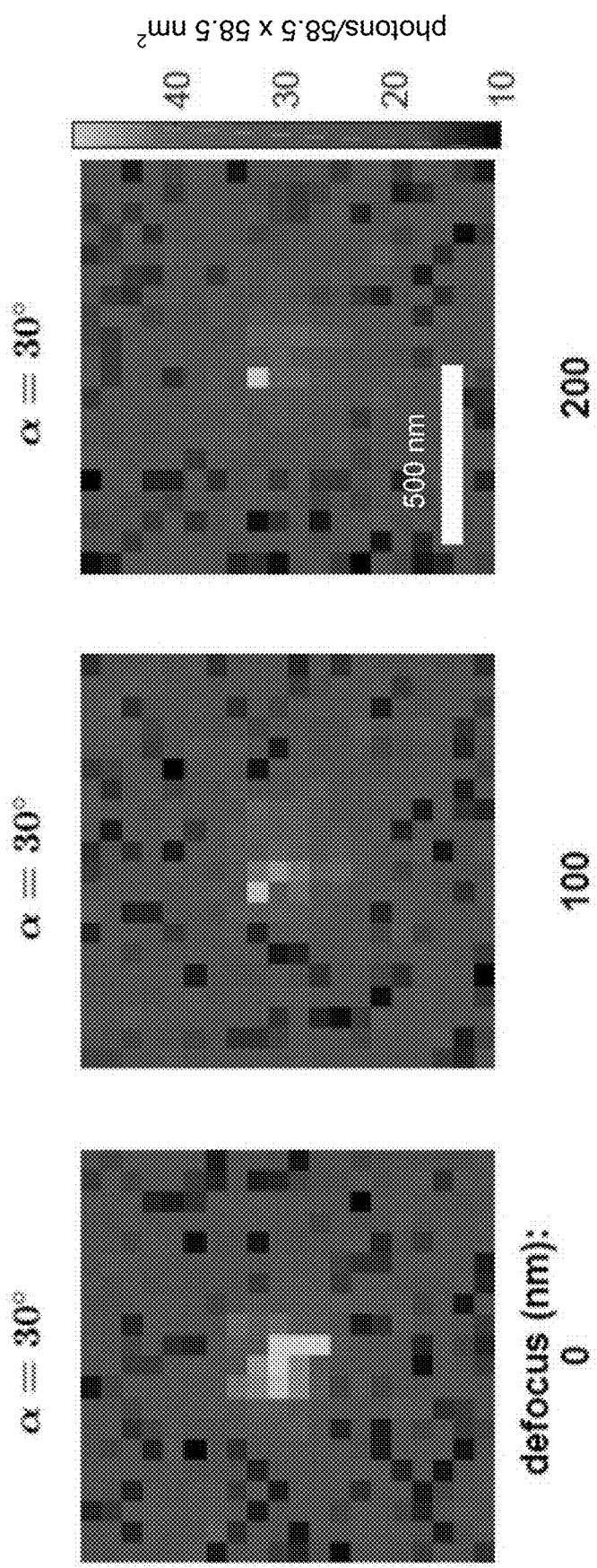
FIG. 10C contains examples of images analyzed to produce the graphs of FIGS. 9A and 9B for $\alpha=30°$ and a defocus of 0 nm (left), 100 nm (middle), and 200 nm (right).

The effectiveness of WIF at quantifying dipole-induced imaging errors, further exacerbated by defocus was also evaluated. Molecules inclined at 45° with respect to the optical axis and various degrees of rotational within cones of half angles $\alpha=90°$ (effectively unconstrained), $\alpha=30°$, and $\alpha=15°$ (highly constrained) were evaluated (FIG. 10C). Here, $\alpha=90°$ corresponds to an isotropic molecule similar to our model, whereas $\alpha=15°$ represents a strongly constrained molecule that induces mismatch in the measurements. For a photon count of 1000, notably, we observe consistent decrease (below 0.85) in median confidences for both $\alpha=30°$ and $\alpha=15°$ across all z, while for the isotropic molecule the median confidence drops below 0.9 only for z greater than 160 nm. In addition, confidences for $\alpha=15°$ are consistently smaller than those of $\alpha=30°$, which shows the consistency of this confidence metric, trending smaller as the degree of mismatch increases (FIG. 10A). On the other hand, normalized width estimates are practically indistinguishable for all a and z values (FIG. 10B).

Figures 11A, 11B:
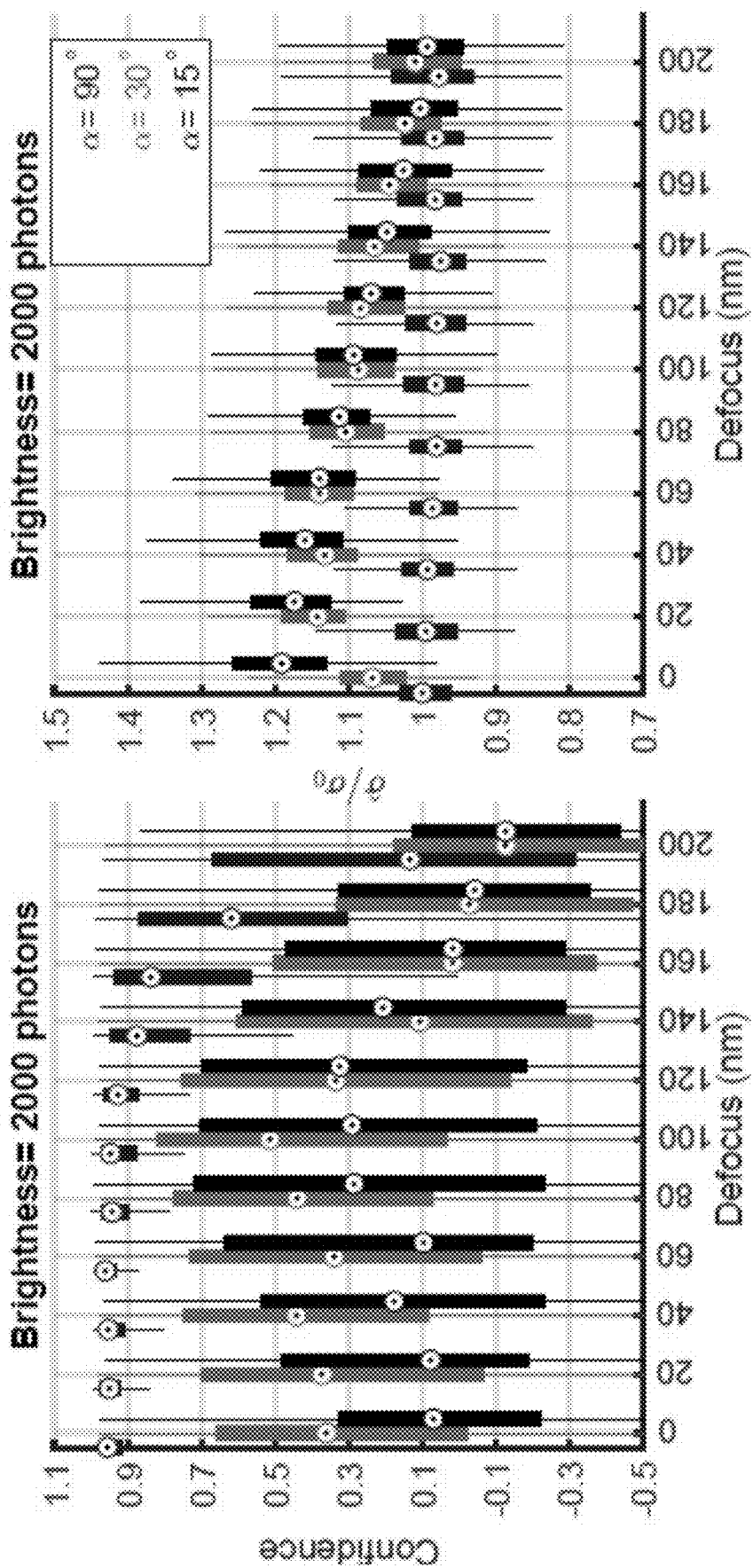
FIG. 11A is a graph similar to the graph of FIG. 10A produced by the analysis of dipoles with a brightness of 2000 photons.
FIG. 11B is a graph similar to the graph of FIG. 11A, for normalized PSF width estimates ($\hat{\sigma}/\sigma_0$).
Figure 11C:
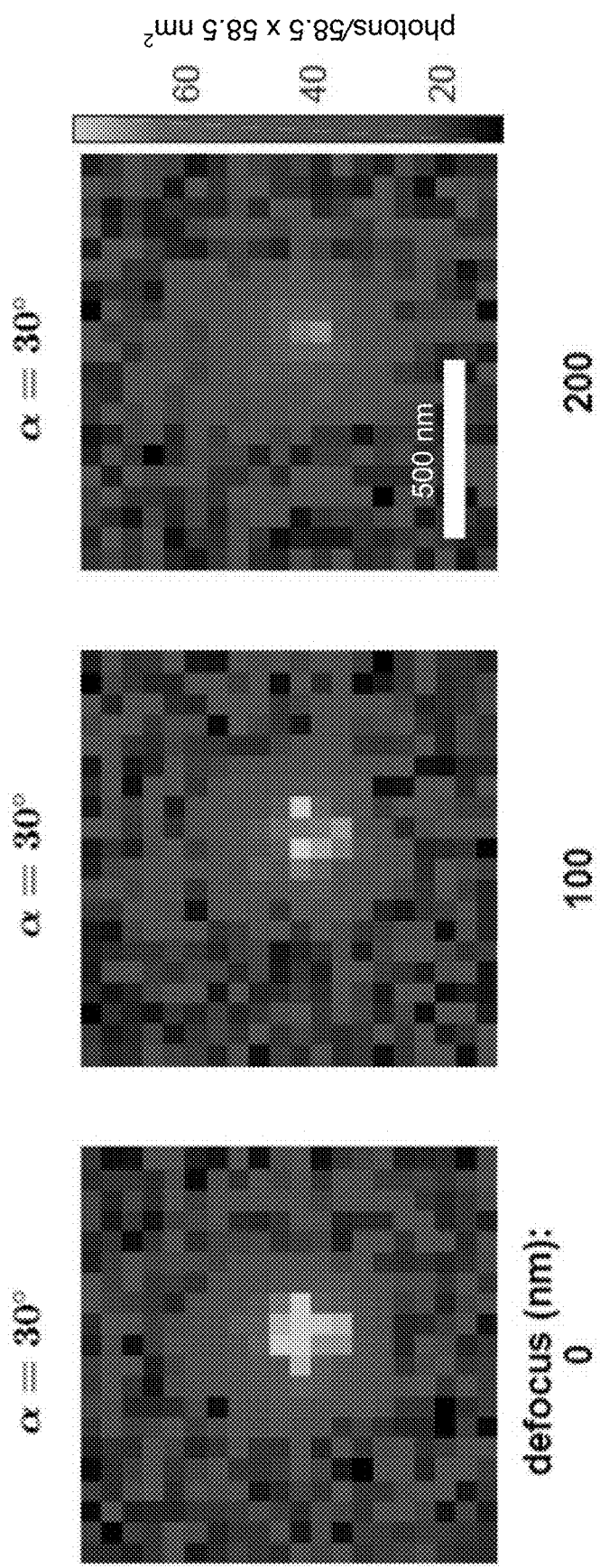
FIG. 11C contains examples of images analyzed to produce the graphs of FIGS. 9A and 9B for $\alpha=30°$ and a defocus of 0 nm (left), 100 nm (middle), and 200 nm (right).

A brighter molecule (2000 photon counts) was similarly assessed (FIG. 11C), and it was observed that confidences for both $\alpha=30°$ and $\alpha=15°$ significantly decreased below 0.5 for almost all z positions (FIG. 11A). Surprisingly, the normalized width estimates for $\alpha=30°$ and $\alpha=15°$ converge to their nominal (in focus) value as z approaches 200 nm (FIG. 11B). Therefore, confounding molecular parameters (e.g., a defocused dipole-like emitter) may cause estimates of PSF width to appear unbiased, while our WIF metric consistently detects these image distortions and yields small confidence values, resulting in a quantitative, interpretable measure of image trustworthiness. Collectively, these analyses demonstrate that WIF provides a consistent measure of localization confidence for various forms of experimentally feasible mismatches.

Example 2: Quantifying Localization Accuracy without Ground Truth

A series of camera frames and the corresponding set of localizations returned by an arbitrary algorithm are analyzed as described below to assess the trustworthiness of each localization and to quantify the aggregate accuracy of the said algorithm. Without being limited to any particular theory, this assessment may be interpreted as a game "played" between an oracle who knows the ground-truth positions of molecules and a localization algorithm. In practice, the ground-truth positions of molecules are not accessible. How can the accuracy of estimated localizations be evaluated without these ground-truth positions in hand?

In various aspects, average confidence is used as a novel metric for quantifying the collective accuracy of these localizations (with confidences $\{c_1, \ldots, c_N\}$) according to:

$$WIF_{avg} \triangleq \frac{1}{N}\sum_{i=1}^{N} c_i \qquad \text{Eqn. [39]}$$

Insight into Eqn. [39] may be gained by examining its correspondence to the well-known Jaccard index (JAC). To compute Jaccard index, one uses an oracle to determine the credibility of a localization based on its distance to the ground-truth positions. Given a set of ground-truth positions and corresponding localizations, these points are matched by solving a bipartite graph-matching problem of minimizing the sum of distances between the two elements of a pair. A pairing is classified as successful if the distance between the corresponding two elements is smaller than twice the full width at half maximum (FWHM) of the localization precision. Those elements that are paired with a ground-truth position are counted as true positive (TP) and those without a pair are counted as false positive (FP). Finally, any ground-truth molecules without a match are counted as false negative (FN).

The Jaccard index JAC was defined as:

$$JAC = TP/(TP+FN+FP) \qquad \text{Eqn. [40]}$$

where TP, FN, and FP denote number of true positives, false negatives, and false positives, respectively.

Note that an undetected molecule, that is, a false negative, appears in the denominator of JAC, thereby reducing its calculated value. In one aspect, it is posited that this same undetected molecule adversely affects the confidence of a close-by localized molecule, thereby reducing $WIF_{avg}$. This intuitive connection between JAC and $WIF_{avg}$ suggests that the average confidence may serve as a good surrogate for localization accuracy. Significantly, the disclosed WIF method obviates the need for knowing the ground-truth positions of underlying molecules to assess confidence.

Figure 2A:
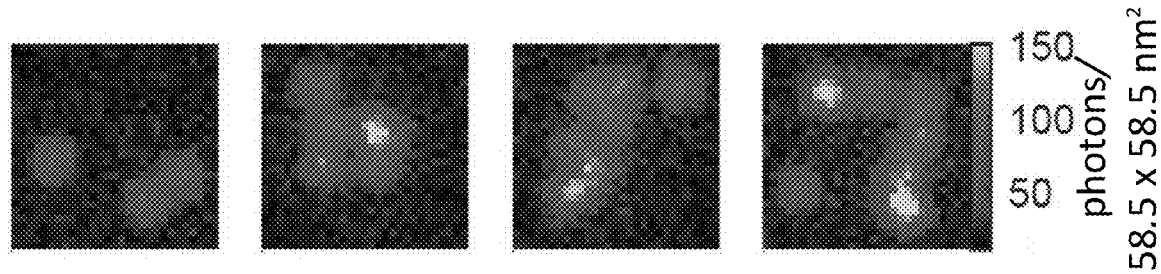
FIG. 2A contains a series of images of molecules with blinking densities of 3, 5, 7, and 9 molecules/$\mu m^2$, respectively.
Figure 2B:
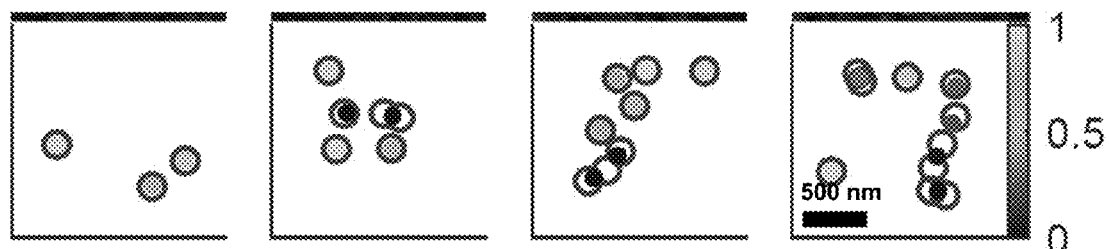
FIG. 2B contains a series of images of RoSE localizations (colored dots represent calculated confidence) corresponding to the images of FIG. 2A, where red circles represent ground-truth positions.

To quantitatively demonstrate $WIF_{avg}$ as a metric for localization accuracy, the performances of two existing algorithms, RoSE and ThunderSTORM are used to localize emitters of various blinking densities (defined as number of molecules per $\mu m^2$ as described below) were evaluated using the disclosed WIF method. (FIGS. 2A and 2B). Jaccard index was calculated by the oracle as well as $WIF_{avg}$ for each density.

For both RoSE and TS, excellent agreement was observed between $WIF_{avg}$ and Jaccard index for densities as high as 5 molecules/$\mu m^2$. For higher densities, $WIF_{avg}$ monotonically decreases at a rate differing from that of Jaccard index. For instance, at high densities JAC for TS saturates to 0.1, whereas $WIF_{avg}$ further decreases due to high FN and low TP, exacerbating the non-convexity of the negative log-likelihood landscape (FIG. 2C).

In one aspect, the disclosed confidence metric $WIF_{avg}$ may be used to identify and remove localizations characterized as having poor accuracy. We quantify the improvement in JAC index by filtering localizations with confidence smaller than 0.5 and then passing these localizations to the oracle to calculate Precision=TP/(TP+FP) and Recall=TP/(TP+FN). If filtered localizations truly represent false positives, an increase in Precision and a relatively unchanged Recall would be expected as a result of removing localizations characterized as having poor accuracy according to $WIF_{avg}$. As illustrated in FIG. 2D, a Precision enhancement as high as 180% for TS and a desirable increase of 23% for RoSE (density=9 molecules/$\mu m^2$) was observed after filtering the localizations using the WIF method described above. Remarkably, these improvements are accompanied by negligible loss in Recall (13% in the worst case) across all densities for both algorithms (FIG. 2E). Overall, these results further demonstrate that $WIF_{avg}$ represents a reliable means of quantifying localization accuracy without having access to the ground-truth molecular parameters.

Example 3: Quantifying and Revealing Artifacts in High-Density Datasets

One challenge encountered in high-density (HD) localization, when images of molecules overlap on the camera, is image artifacts that distort SMLM reconstructions in a structured, or vectorial, manner. Constructing an SMLM error map using a reference image has been proposed to certify the reliability of the SMLM reconstruction, but such a map does not quantify the reliability of each individual localization within the image. The power of measuring point confidence in quantifying and revealing artifacts is illustrated in the challenging HD localization experiment described below.

Figure 3B:
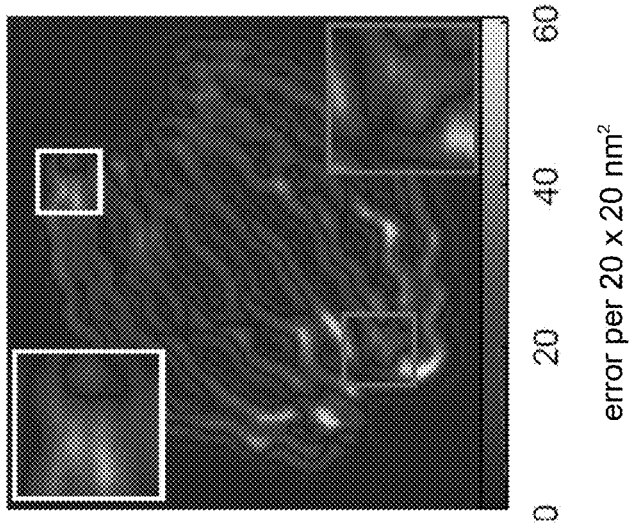
FIG. 3B is an image of an error map recovered by SQUIRREL (brighter colors correspond to larger errors).
Figure 3A:
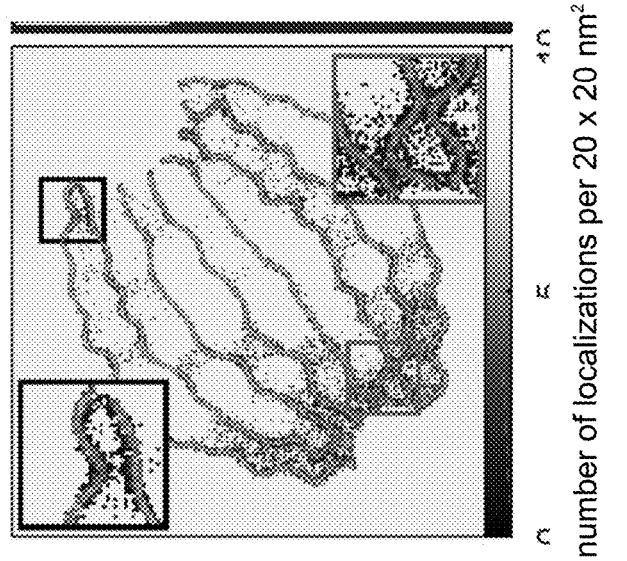
FIG. 3A is an image of recovered structure (red) using FALCON overlaid with ground truth (green).

FALCON, an HD localization algorithm, was used to reconstruct a simulated benchmark SMLM dataset consisting of 360 HD frames of a tubulin network (FIG. 3A). In regions where the tubules coalesce, corresponding to higher blinking densities, numerous inaccurate localizations (FIG. 3A, insets) were observed. In particular, fusion and broadening of tubules was observed instead of the anticipated thin and separate structures. A reliable error map should assign low confidence or high error to such regions while discriminating fine but accurate details of the structure. Interestingly, significant differences between the error map (obtained via SQUIRREL) and the confidence map produced using the WIF method described above were observed (FIGS. 3B and 3C). First, the SQUIRREL error map appeared to overestimate errors in regions with accurate localizations, while the WIF confidence map exhibited low confidence on regions with inaccurate localizations and assigned high confidence to neighboring parallel tubules (FIGS. 3B and 3C, top insets). Second, the SQUIRREL error map underestimated the error in the regions here tubules were apparently fused, whereas the WIF confidence map assigned an overall low confidence to this region, suggesting potential artifacts (FIGS. 3B and 3C, bottom insets). Overall, the WIF confidence map enabled the discrimination of specific SMLM localizations that were trustworthy, while also assigning low confidence values to those that were not, thereby maximizing the utility of SMLM datasets without throwing away useful localizations.

Example 4: Calibrating and Validating WIF Using SMLM of Microtubules

A super-resolution dataset often contains well-isolated images of molecules, e.g., after a significant portion of the molecules are bleached. These images can therefore serve as a useful internal control, taken under realistic conditions, to assess the performance of a PSF model as well as SMLM algorithms themselves on a particular dataset. As a practical example, an SMLM dataset of blinking AlexaFluor 647-labeled microtubules was examined.

The microtubules of BSC-1 cells were immunolabeled with Alexa Fluor 647 (Invitrogen) and imaged under blinking conditions with glucose oxidase/catalase and mM concentrations of mercaptoethylamine (MEA). The sample was imaged using an Olympus IX71 epifluorescence microscope equipped with a 100×1.4 NA oil-immersion objective lens (Olympus UPlan-SApo 100×/1.40). The sample was excited using a 641-nm laser source (Coherent Cube, peak intensity~10 kW/cm$^2$).

Fluorescence from the microscope was filtered using a dichroic beamsplitter (Semrock, Di01-R635) and bandpass filter (Omega, 3RD650-710) and separated into two orthogonally-polarized detection channels, but only one channel was used for this analysis. Fluorescence photons were captured using an electron-multiplying CCD camera (Andor iXon+DU897-E) at an EM gain setting of 300 with pixel size of 160×160 nm$^2$ in object space.

Figure 4A:
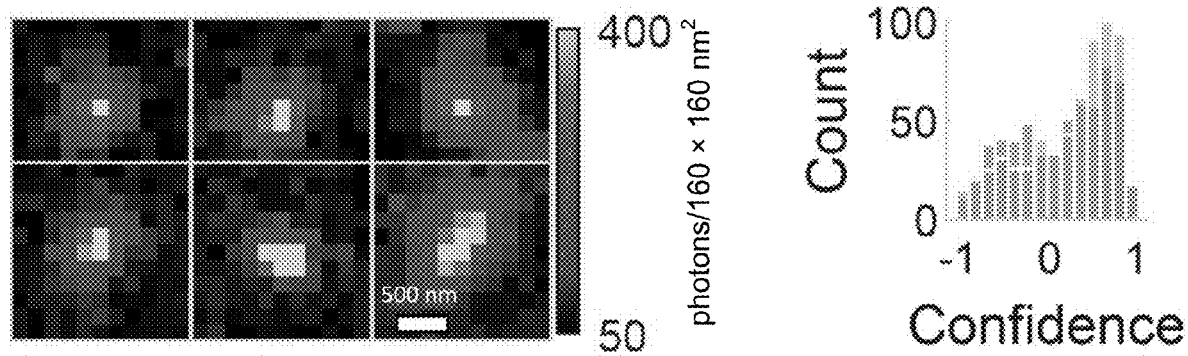
FIG. 4A contains a series of isolated images of Alexa Flour 647 molecules (left) and a graph (right) summarizing the localization confidences for 600 isolated images using RoSE (red) and TS (green).

600 images of bright molecules sampled over the entire field of view were randomly selected (FIG. 4A). An ideal PSF model was used to localize these molecules using RoSE, but the mean confidence of these localizations was observed to be notably small ($WIF_{avg}$=−0.36), implying the presence of significant aberrations and PSF model mismatches (FIG. 12).

In light of these findings, a physics-based PSF model was calibrated and used to reanalyze the data. The microscope pupil function P was modeled as expressed by:

$$P(u,v)=\exp(1j\Sigma_{i=3}^I\{a_iZ_i(u,v)\})\cdot P_0(u,v) \qquad \text{Eqn. [41]}$$

where (u, v) are microscope's pupil coordinates; $a_i$ and $Z_i$ represent the $i^{th}$ Zernike basis and its corresponding coefficient; and $P_0$ denotes the pupil function of the uncalibrated model. 33 Zernike modes corresponding to 1=35 were used.

Figure 4B:
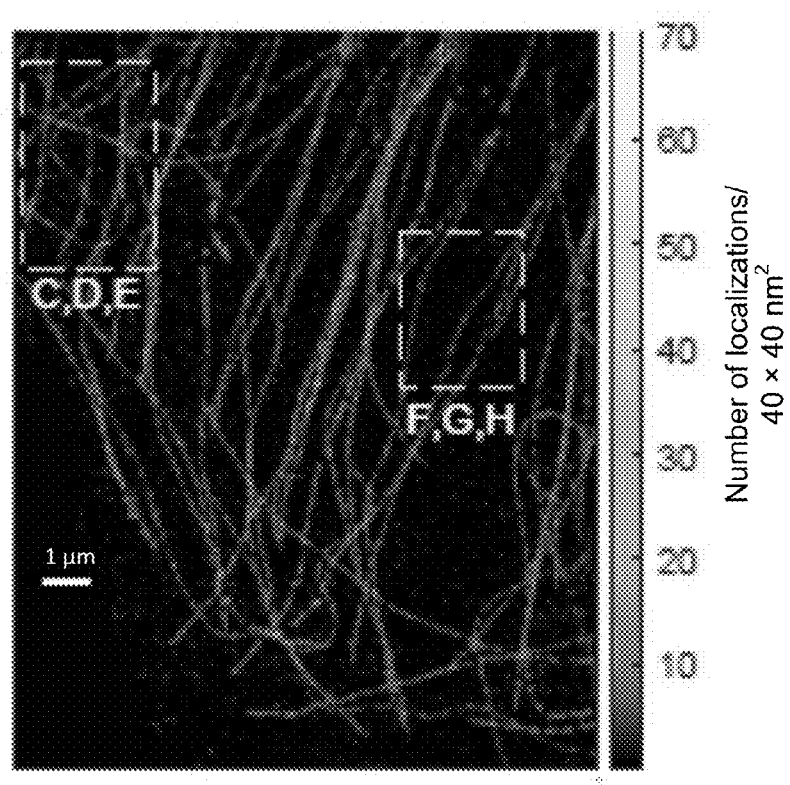
FIG. 4B is a super-resolution image of Alexa Fluor 647-labeled microtubules recovered by RoSE.

Using RoSE, well-isolated molecules over a large field-of-view (FOV) corresponding to FIG. 4B were localized. For each localization, an image of size 11×11 pixels was obtained with the localized molecule being at its center. Molecules with brightnesses less than 3000 photons or with positions away from the origin by more than a pixel were excluded. 600 of these images were randomly selected to estimate the Zernike coefficients, i.e., $\{a_1 \ldots a_1\}$. The calibrated PSF was then computed based on recovered P.

After calibration, the confidences estimated using RoSE exhibited a notable increase of 0.79 ($WIF_{avg}$=0.43). At the same time, a rather broad distribution of confidences was observed, suggesting that field-dependent aberrations, such as varying defocus, were present in certain regions of the structure (FIG. 11). It was found that the use of a calibrated PSF by RoSE produced localizations with higher confidence values ($WIF_{avg}$=0.43) compared to the use of an elliptical Gaussian PSF in TS ($WIF_{avg}$=0.15) (FIG. 4A). The higher average confidence score for RoSE suggested that RoSE may recover the underlying structure with greater accuracy compared to TS.

Figure 4H:
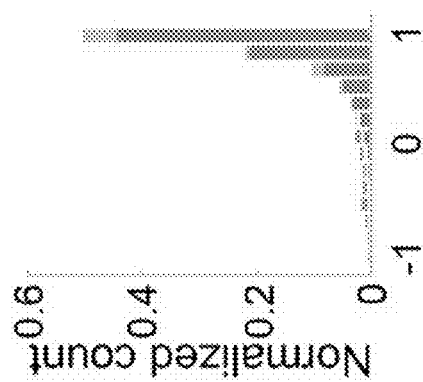
FIG. 4H is a graph containing a histogram of confidences corresponding to localizations in FIG. 4F (RoSE, red) and to localizations in FIG. 4G (TS, green).
Figure 4F:
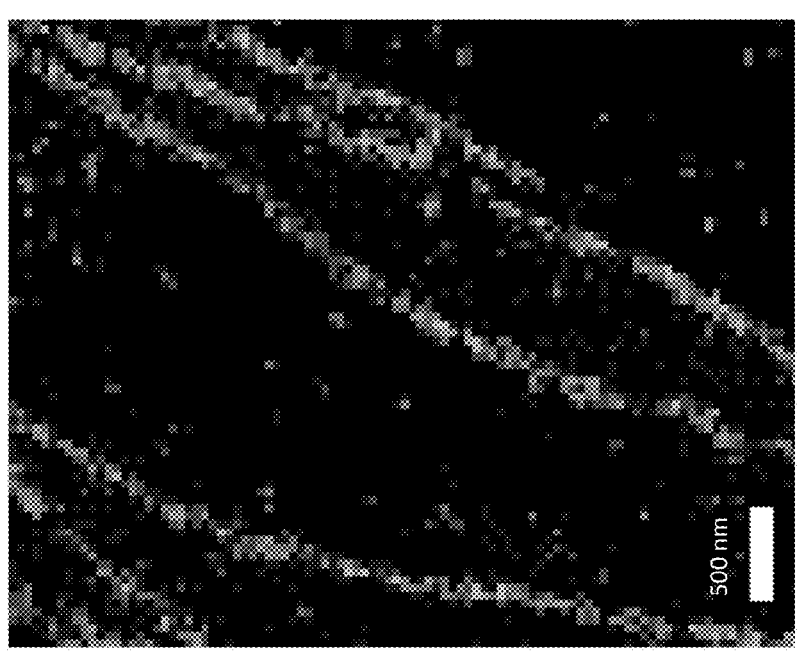
FIG. 4F is a zoomed-in super-resolution image of Alexa Fluor 647-labeled microtubules within the rectangular region of FIG. 4B labeled F, G, H, as recovered by RoSE.
Figure 4G:
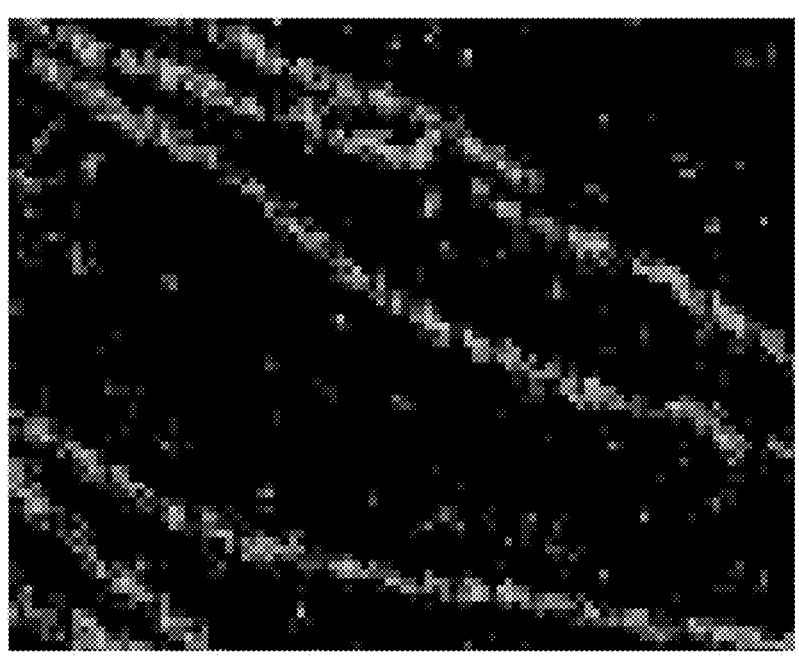
FIG. 4G is the zoomed-in super-resolution image of Alexa Fluor 647-labeled microtubules within the rectangular region of FIG. 4B labeled F, G, H, as recovered by TS.

The experiments described above confirmed the consistency of localization confidences, using the disclosed WIF method, in the absence of the ground truth, through the perceived quality of the super-resolution reconstructions (FIG. 4B). More confident localizations are expected to result in an image with greater resolution, whereas localizations with poor confidence are expected to fail to resolve fine details and to potentially distort the underlying structure. Within a region containing a few parallel and well separated microtubules, similar confidences were observed for both algorithms (FIG. 4H), resulting in images of similar quality (FIGS. 4F and 4G). Conversely, for a region with intersecting microtubules, marked qualitative and quantitative differences between the two reconstructions were observed (FIGS. 4C and 4D). RoSE was able to resolve structural details near the intersections, while the TS image contains missing and blurred localizations near the crossing points. Moreover, RoSE recovered the curved microtubule faithfully, whereas TS failed to reconstruct its central part (lower red arrow in FIGS. 4C and 4D). Quantitatively, RoSE exhibited notably greater confidence in its localizations compared to TS, which showed negative confidences for an appreciable number of localizations (FIG. 4E). Without being limited to any particular theory, this confidence gap, in part, can be caused by hidden parameters such as high-blinking density. These SMLM reconstructions demonstrated that localization confidences obtained from both images of isolated molecules as well as HD datasets were a consistent and quantitative measure of algorithmic performance.

Example 5: Quantifying Algorithmic Robustness and Molecular Heterogeneity

WIF was used to characterize algorithmic performance on a Transient Amyloid Binding (TAB) dataset of imaged amyloid fibrils. The TAB dataset, which includes relatively large shot noise in images of Nile red (<1000 photons per frame) was selected to assess the robustness of three distinct algorithms: TS with weighted-least squares (WLS) using a weighted Gaussian noise model; TS with maximum likelihood estimation (MLE) using a Poisson noise model; and RoSE, which similarly uses a Poisson noise model but also is robust to image overlap.

Figures 5A, 5B, 5C:
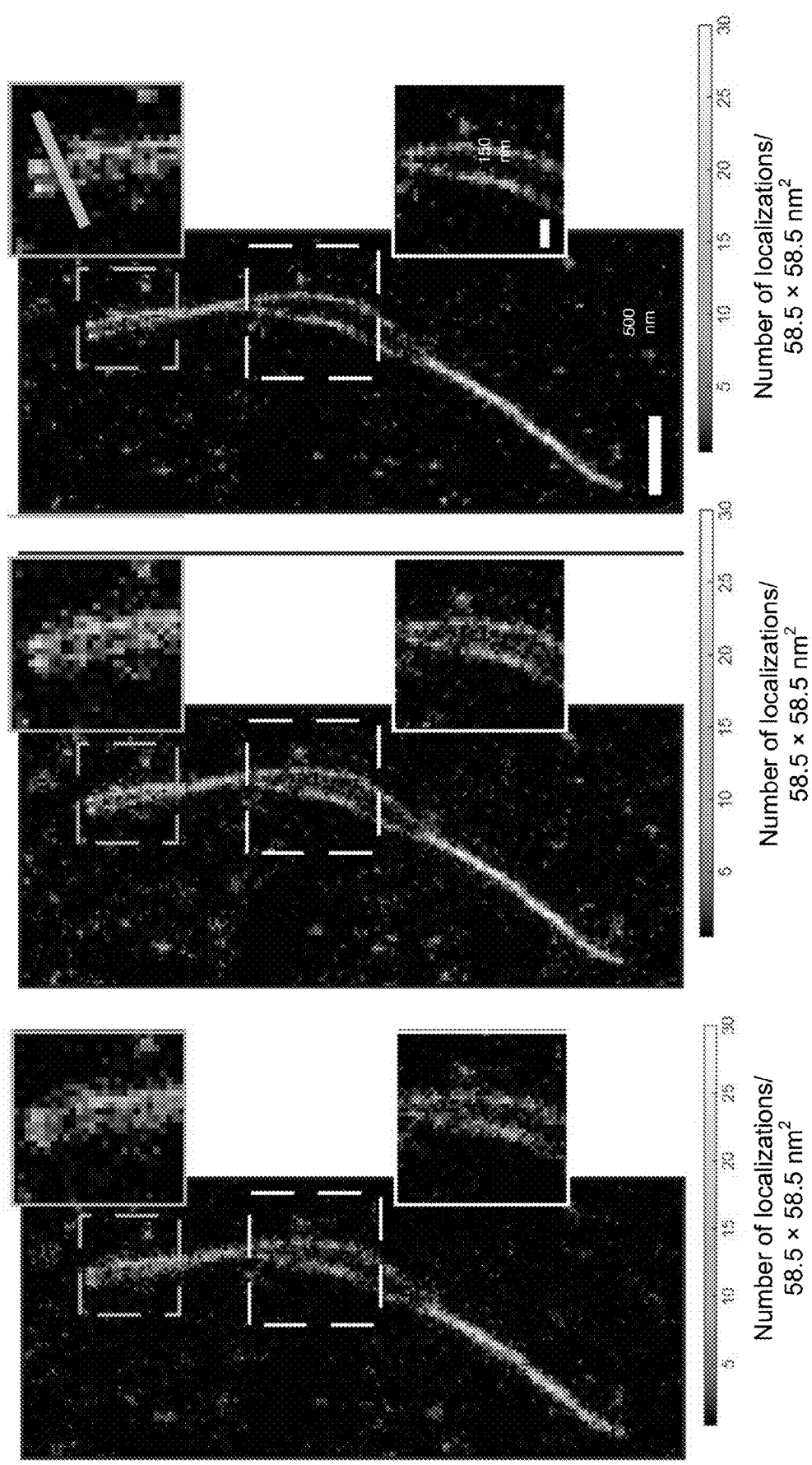
FIG. 5A is a super-resolution SMLM image of twisted amyloid fibrils recovered by WLS.
FIG. 5B is a super-resolution SMLM image of twisted amyloid fibrils recovered by MLE.
FIG. 5C is a super-resolution SMLM image of twisted amyloid fibrils recovered by RoSE.

Qualitative and quantitative differences were readily noticeable between reconstructed images, particularly where the fibrillar bundle unwinds (FIGS. 5A, 5B, and 5C, insets). The poor localization of WLS, exemplified by broadening of the fibrils, may be attributed to its lack of robustness to shot noise. Using a Poisson noise model in place of the WLS model, MLE recovered thinner and better resolved fibrils, but struggled to resolve fibrils at the top end of the structure (FIGS. 5B and 5E). This inefficiency was probably due to algorithmic failure on images containing overlapping molecules. In contrast, RoSE localizations had greater precision, thereby enabling the parallel unbundled filaments to be resolved (FIGS. 5C and 5F). These perceived image qualities may be reliably quantified via WIF. Indeed, RoSE localizations showed the greatest confidence of the three algorithms with $WIF_{avg}$=0.78 while WLS showed a low $WIF_{avg}$ of 0.18 attesting to their excellent and poor recovery, respectively (FIGS. 5G, 5H, and 5I). Interestingly, in terms of FRC, RoSE had only 3% better resolution compared to MLE.

Figure 13A:
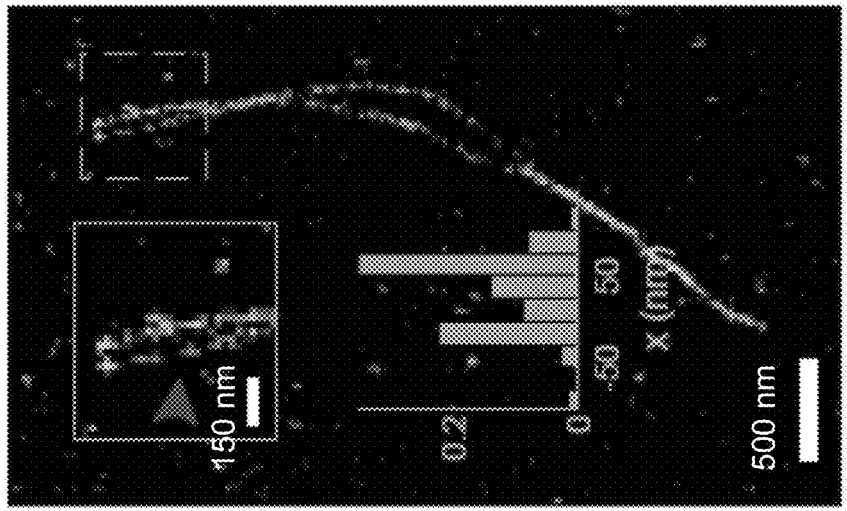
FIG. 13A is the reconstructed image of fibrillar structures of FIG. 5K superimposed with a histogram of localizations with PSF width estimates within the range [90 nm, 110 nm]; localizations were selected within the dashed rectangles projected onto an axis transverse to the fibrils.
Figure 13B:
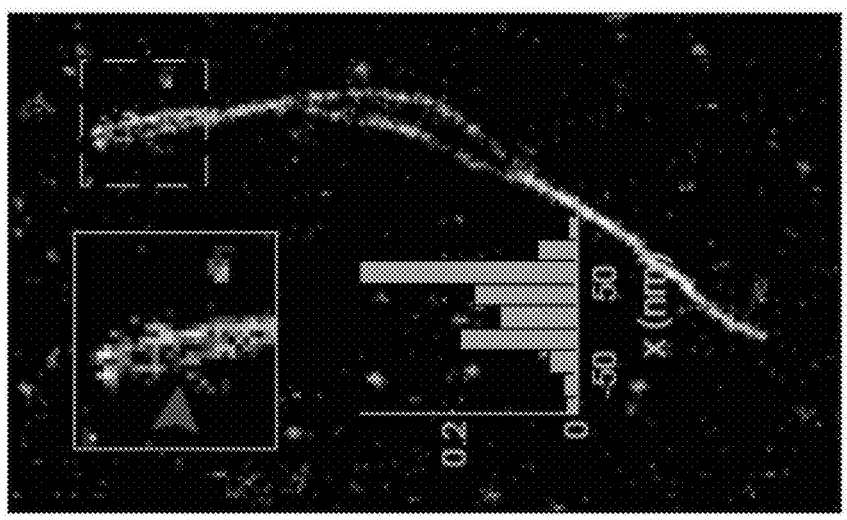
FIG. 13B is an image and histogram similar to FIG. 13A, in which the histogram summarizes localizations with PSF width estimates within the range [70 nm, 130 nm].
Figure 13C:
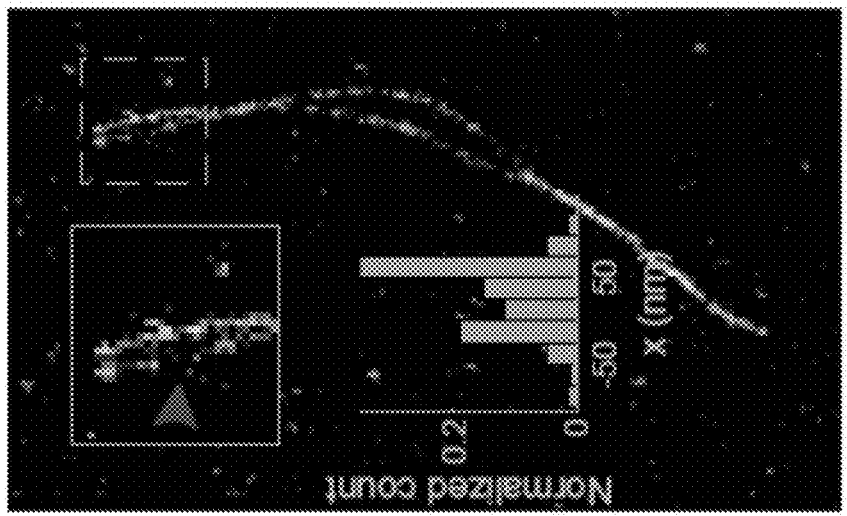
FIG. 13C is the reconstructed image of fibrillar structures of FIG. 5K superimposed with a histogram of localizations with WIF>0.5; localizations were selected within dashed rectangles projected onto an axis transverse to the fibrils.

To further affirm WIF as a reliable measure of accuracy at the single-molecule level, all localizations with confidence smaller than 0.5 were filtered out. Remarkably, filtered reconstructions from all three algorithms appeared to resolve unbundled fibrils (FIGS. 5J, 5K, and 5L). In contrast, filtering based on estimated PSF width produced sub-optimal results. Notably, retaining MLE localizations within a strict width range ($W_1 \in [90, 110$ nm]) improved filament resolvability at the cost of compromising sampling continuity (FIG. 13A). For a slightly larger range ($W_2 \in [70, 130$ nm]), the filtering was ineffective and the fibrils were not well resolved (FIG. 13B). In contrast, filtered localizations based on WIF, qualitatively and quantitatively, resolved fine fibrillar features (FIG. 13C).

A powerful feature of WIF is its ability to quantify an arbitrary discrepancy between a computational imaging model and SMLM measurements. This property is particularly useful since hidden physical parameters, which may be difficult to model accurately, can induce perturbations in the observed PSF. Therefore, WIF may be used to interrogate variations in the interactions of Nile red with amyloid fibrils that are encoded into SMLM images. To demonstrate this feature, TAB fibrillar datasets were analyzed using RoSE and WIFs of localizations on the fibrils were calculated (detected photons >400).

Figure 6A:
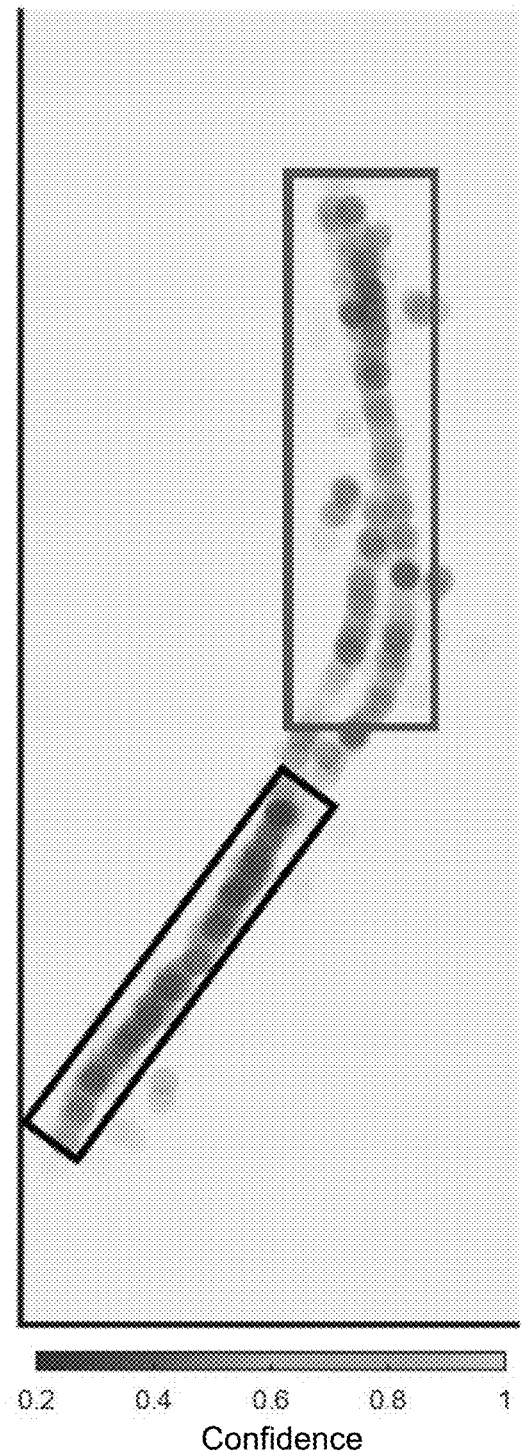
FIG. 6A is an image showing a density map of WIFs for bright localizations (>400 detected photons) imaged from Nile red interactions with amyloid fibrils.
Figure 6B:
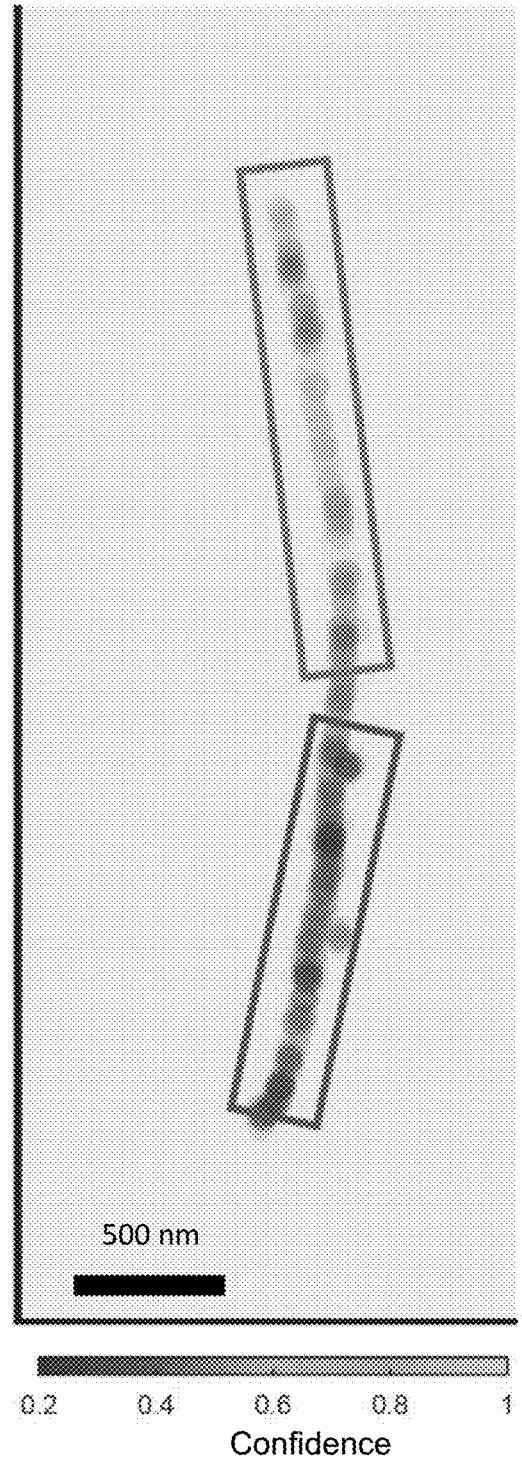
FIG. 6B is an image showing a second density map of WIFs for bright localizations (>400 detected photons) imaged from Nile red interactions with amyloid fibrils.
Figure 6C:
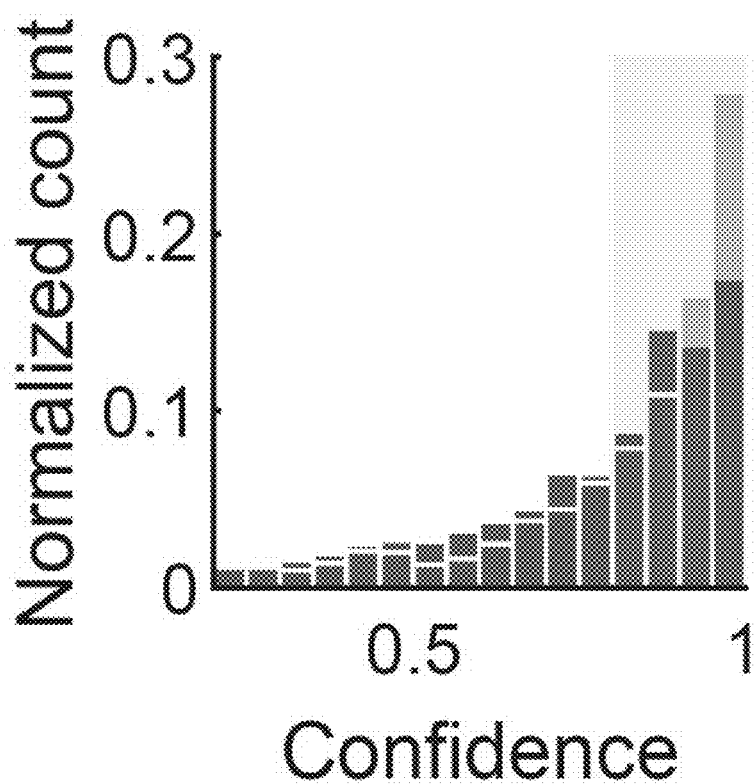
FIG. 6C is a histogram of WIFs for localizations within corresponding boxed regions (upper magenta and lower black) of FIG. 6A.
Figure 6D:
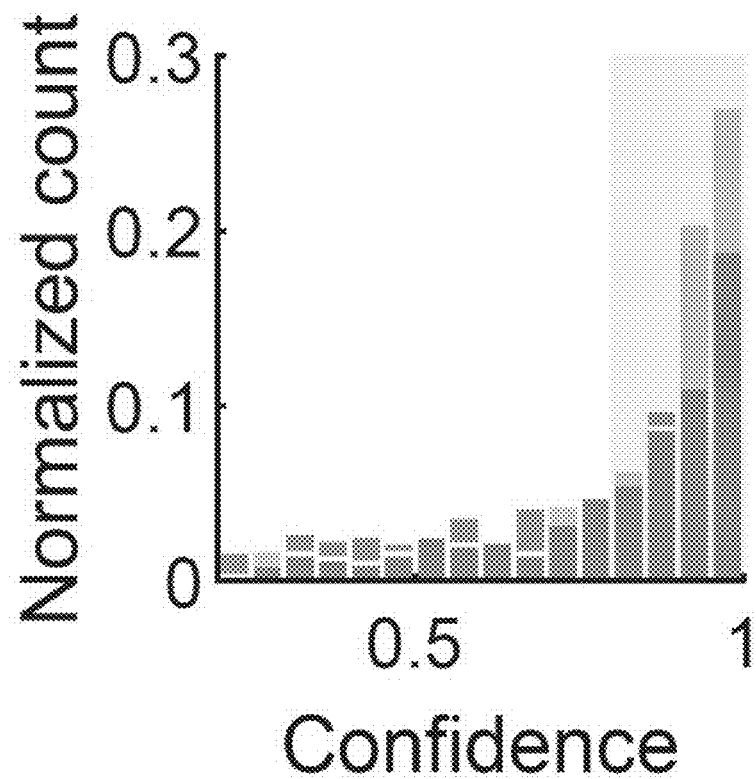
FIG. 6D is a map of the histogram of WIFs for localizations within corresponding boxed regions (upper orange and lower blue) of FIG. 6B.

Interestingly, WIF density plots revealed heterogeneous regions along both fibrils. Specifically, for segments of fibrils that were oriented away from the vertical axis, a larger portion of localizations had low confidence (<0.5) compared to regions that were vertically oriented (FIGS. 6A and 6B). Quantitatively, the upper regions of two fibrils had 17% (FIG. 6C) and 37% (FIG. 6D) more localizations with confidence greater than 0.8, respectively. To examine the origin of this heterogeneity, observed PSFs from high- and low-confidence regions were directly compared. Curiously, PSFs in the bottom regions were slightly oriented along the fibril structure, whereas PSFs from the top regions better matched the WIF model (FIG. 14). These features may be attributed to orientation of Nile red molecules upon binding to fibrils. These fine differences were detected and quantified by WIF and cannot otherwise be distinguished by width estimates (FIG. 14).

Example 6: Equilibrium Points of the Negative Expected Log Likelihood

To provide a framework to assess the problem of localizing two closely-spaced molecules, the following analysis was performed. The molecules are assumed (with no loss of generality) to be located at $(0, r^*_y)$ and $(0, -r^*_y)$ with equal photon counts. Assuming a Gaussian PSF model, a noisy realization of their image $g \in \mathbb{R}^m$ is formed according to the Poisson distribution:

$$\mu_i^* \overset{\Delta}{=} A\left\{s \exp\left(-\frac{(u_i)^2 + (v_i - r_y^*)^2}{2\sigma^2}\right) + s \exp\left(-\frac{(u_i)^2 + (v_i + r_y^*)^2}{2\sigma^2}\right)\right\} + b_i,$$

$$g_i \sim Pois(\mu_i^*), \; i \in \{1, \dots, m\}$$

Eqn. [42]

where A is a known normalizing constant, $\sigma$ is the PSF width, $b \in \mathbb{R}^m$ denotes background, m is the number of pixels, and Pois represents the Poisson probability distribution.

It is further assumed that $\sigma$, b, and s are known a priori. Therefore, the negative, Poisson log-likelihood model $\mathcal{L}$, parameterized by an algorithm's estimated molecular positions $(r_x, r_y)$, and its expectation $\varepsilon$ over many realizations may be represented as follows:

$$\mu_i^* \overset{\Delta}{=} A\left\{s \exp\left(-\frac{(u_i - r_x)^2 + (v_i - r_y)^2}{2\sigma^2}\right) + s \exp\left(-\frac{(u_i + r_x)^2 + (v_i + r_y)^2}{2\sigma^2}\right)\right\} + b_i,$$

$$i \in \{1, \dots, m\}$$

Eqn. [43]

$$\mathcal{L}(r_x, r_y; g) = \sum_{i=1}^{m} \{\mu_i - g_i \log(\mu_i)\}$$

Eqn. [44]

$$\varepsilon(r_x, r_y) \overset{\Delta}{=} \mathbb{E}\mathcal{L} = \sum_{i=1}^{m} \mu_i - \mathbb{E}(g_i \log(\mu_i)) = \sum_{i=1}^{m} \mu_i \log(\mu_i)$$

Eqn. [45]

By taking the derivative of $\varepsilon$ with respect to $r_y$ we obtain $$\frac{\partial \varepsilon}{\partial r_y} = \sum_{i=1}^{m} \frac{\partial \mu_i}{\partial r_y} - \frac{\mu_i^*}{\mu_i} \frac{\partial \mu_i}{\partial r_y}$$

Eqn. [46]

$$\frac{\partial \mu_i}{\partial r_y} = \frac{As(u_i - r_y)}{\sigma^2} \exp\left(-\frac{(u_i - r_x)^2 + (v_i - r_y)^2}{2\sigma^2}\right) - \frac{As(u_i + r_y)}{\sigma^2} \exp\left(-\frac{(u_i + r_x)^2 + (v_i + r_y)^2}{2\sigma^2}\right)$$

Eqn. [47]

A similar expression can be obtained for derivative of $\varepsilon$ with respect to $r_x$. It follows that $(r_x=0, r_y=0)$ is an equilibrium point of $\varepsilon$. Note that $(0, 0)$ is located at center of $(0, r^*_y)$ and $(0, -r^*_y)$. In FIG. 7, the surface of $\varepsilon$ is mapped for various $(r_x, r_y)$ when $r^*_y = 35$ nm and $r^*_x = 0$. Interestingly, $(0, 0)$ was observed to be a saddle point.

What is claimed is:

1. An image analysis system for assessing an accuracy of at least one localization from a single molecule localization microscopy (SMLM) dataset containing a plurality of localizations, the system comprising a computing device with at least one processor and a non-volatile computer-readable memory, the non-volatile computer-readable memory containing a plurality of instructions executable on the at least one processor, the plurality of instructions comprising a WIF component configured to calculate a Wasserstein-induced flux (WIF) value for each localization of the at least one localization, wherein each WIF value is indicative of the accuracy of each localization.

2. The image analysis system of claim 1, wherein the WIF value is calculated using the equation $$WIF_i = \frac{\sum_{j=1}^{8} \hat{s}_{[i,j]} \|\Delta \tilde{r}_{[i,j]}\|_2 \cdot \cos \zeta_{[i,j]}}{\sum_{j=1}^{8} \hat{s}_{[i,j]} \|\Delta \tilde{r}_{[i,j]}\|_2},$$

wherein $WIF_i$ denotes a WIF value for an $i^{th}$ localization of a point source, $\hat{s}$ denotes a strength of the point source, $\Delta \tilde{r}$ denotes a transport trajectory of photons from the point source to j surrounding grid points, and $\zeta$ is a transport angle between the $i^{th}$ localization and the transport trajectory of the point source.

3. The image analysis system of claim 1, wherein the WIF component is further configured to calculate an average WIF value for at least a portion of the SMLM dataset by obtaining an average value of the WIF values calculated for each localization of the at least a portion of the SMLM dataset, wherein the average WIF value is indicative of the accuracy of the at least a portion of the SMLM dataset.

4. The image analysis system of claim 1, wherein the WIF component is further configured to remove localizations with WIF values below a threshold confidence value from the SMLM dataset to produce a high-confidence SMLM dataset.

5. The image analysis system of claim 4, wherein the threshold confidence value is about 0.5.

6. A computer-implemented method for assessing an accuracy of at least one localization from a single molecule localization microscopy (SMLM) dataset containing a plurality of localizations, the method comprising calculating, using a computing device a Wasserstein-induced flux (WIF) value for each localization of the at least one localization, wherein each WIF value is indicative of the accuracy of each localization.

7. The computer-implemented method of claim 6, wherein the WIF value is calculated using the equation $$WIF_i = \frac{\sum_{j=1}^{8} \hat{s}_{[i,j]} \|\Delta \tilde{r}_{[i,j]}\|_2 \cdot \cos \zeta_{[i,j]}}{\sum_{j=1}^{8} \hat{s}_{[i,j]} \|\Delta \tilde{r}_{[i,j]}\|_2},$$

wherein $WIF_i$ denotes a WIF value for an $i^{th}$ localization of a point source, $\hat{s}$ denotes a strength of the point source, $\Delta \tilde{r}$ denotes a transport trajectory of photons from the point source to j surrounding grid points, and $\zeta$ is a transport angle between the $i^{th}$ localization and the transport trajectory of the point source.

8. The computer-implemented method of claim 6, further comprising calculating, using the computing device, an average WIF value for at least a portion of the SMLM dataset by obtaining an average value of the WIF values calculated for each localization of the at least a portion of the SMLM dataset, wherein the average WIF value is indicative of the accuracy of the at least a portion of the SMLM dataset.

9. The computer-implemented method of claim 6, further comprising removing localizations with WIF values below a threshold confidence value from the SMLM dataset to produce a high-confidence SMLM dataset.

10. The computer-implemented method of claim 9, wherein the threshold confidence value is about 0.5.

11. An SMLM analysis system for enhancing an accuracy of a single molecule localization microscopy (SMLM) dataset comprising a plurality of localizations, the SMLM analysis system comprising a computing device with at least one processor and a non-volatile computer-readable memory, the non-volatile computer-readable memory containing a plurality of instructions executable on the at least one processor, the plurality of instructions comprising a WIF component configured to:
  calculate a Wasserstein-induced flux (WIF) value for each localization of the SMLM dataset, wherein each WIF value is indicative of the accuracy of each localization;
  compare the plurality of WIF values to a threshold confidence value;
  transform, using the computing device, the SMLM dataset to a high-confidence SMLM dataset by discarding a first portion of the plurality of localizations with confidence values below the threshold confidence value.

12. The SMLM analysis system of claim 11, wherein the WIF value is calculated using the equation $$WIF_i = \frac{\sum_{j=1}^{8} \hat{s}_{[i,j]} \|\Delta \tilde{r}_{[i,j]}\|_2 \cdot \cos\zeta_{[i,j]}}{\sum_{j=1}^{8} \hat{s}_{[i,j]} \|\Delta \tilde{r}_{[i,j]}\|_2},$$

wherein $WIF_i$ denotes a WIF value for an $i^{th}$ localization of a point source, $\hat{s}$ denotes a strength of the point source, $\Delta \tilde{r}$ denotes a transport trajectory of photons from the point source to j surrounding grid points, and $\zeta$ is a transport angle between the $i^{th}$ localization and the transport trajectory of the point source.

13. The SMLM analysis system of claim 11, wherein the threshold confidence value is about 0.5.

14. The SMLM analysis system of claim 11, further the WIF component is further configured to calculate an average WIF value for at least a portion of the SMLM dataset by obtaining an average value of the WIF values calculated for each localization of the at least a portion of the SMLM dataset, wherein the average WIF value is indicative of the accuracy of the at least a portion of the SMLM dataset.

15. The SMLM analysis system of claim 11, wherein the WIF component is further configured to reconstruct a high-confidence SMLM image based on the high-confidence SMLM dataset.

* * * * *